United States Patent
Rose et al.

(10) Patent No.: US 8,688,557 B2
(45) Date of Patent: Apr. 1, 2014

(54) SYSTEMS AND METHODS FOR CUSTOMER VALUE OPTIMIZATION INVOLVING RELATIONSHIP OPTIMIZATION

(75) Inventors: David T. Rose, Cumming, GA (US); Donald Henry Hopper, Jr., Stone Mountain, GA (US); Hong Huang, Atlanta, GA (US)

(73) Assignee: Fiserv, Inc., Brookfield, WI (US)

( * ) Notice: Subject to any disclaimer, the term of this patent is extended or adjusted under 35 U.S.C. 154(b) by 0 days.

(21) Appl. No.: 12/893,841

(22) Filed: Sep. 29, 2010

(65) Prior Publication Data
US 2012/0078813 A1    Mar. 29, 2012

(51) Int. Cl.
*G06Q 40/00* (2012.01)

(52) U.S. Cl.
USPC .......................................................... 705/36

(58) Field of Classification Search
USPC .......................................................... 705/36
See application file for complete search history.

(56) References Cited

U.S. PATENT DOCUMENTS

| | | |
|---|---|---|
| 6,196,458 B1 | 3/2001 | Walker et al. |
| 6,321,205 B1 | 11/2001 | Eder |
| 6,321,206 B1 | 11/2001 | Honarvar |
| 6,405,173 B1 | 6/2002 | Honarvar et al. |
| 6,658,393 B1 | 12/2003 | Basch et al. |
| 6,694,300 B1 | 2/2004 | Walker et al. |
| 6,708,155 B1 | 3/2004 | Honarvar et al. |
| 6,725,210 B1 * | 4/2004 | Key et al. .................... 706/45 |
| 7,062,463 B2 | 6/2006 | Knapp |
| 7,117,208 B2 | 10/2006 | Tamayo et al. |
| 7,165,037 B2 | 1/2007 | Lazarus et al. |
| 7,296,734 B2 | 11/2007 | Pliha |
| 7,376,603 B1 * | 5/2008 | Mayr et al. .................... 705/35 |
| 7,403,904 B2 | 7/2008 | Abe et al. |
| 7,519,553 B2 | 4/2009 | Abe et al. |
| 7,552,069 B2 | 6/2009 | Kepecs |
| 7,580,856 B1 | 8/2009 | Pliha |
| 7,610,257 B1 | 10/2009 | Abrahams |
| 7,617,156 B1 | 11/2009 | Wolfson |
| 7,720,761 B2 | 5/2010 | Trench et al. |
| 7,752,100 B1 | 7/2010 | Wasserman et al. |
| 7,813,951 B2 | 10/2010 | Eskandari |
| 7,813,952 B2 | 10/2010 | Eskandari |
| 7,813,983 B2 | 10/2010 | Wottowa et al. |
| 7,814,019 B2 | 10/2010 | Knapp |
| 7,831,467 B1 | 11/2010 | Lefebvre et al. |
| 7,840,428 B2 | 11/2010 | McNab et al. |
| 7,962,406 B2 | 6/2011 | Bishop et al. |
| 7,996,307 B2 | 8/2011 | Bishop et al. |
| 8,005,777 B1 | 8/2011 | Owen et al. |

(Continued)

OTHER PUBLICATIONS

Non-Final Office Action for co-pending U.S. Appl. No. 12/893,822 mailed Aug. 20, 2012.

(Continued)

*Primary Examiner* — Clifford Madamba
(74) *Attorney, Agent, or Firm* — Sutherland Asbill & Brennan LLP

(57) ABSTRACT

Systems and methods can provide for customer value optimization. The customer value optimization can include analyzing certain transaction and/or non-transaction data of customers with one or more predictive models to determine predictive modeling scores, values, or indicators. These one or more predictive modeling scores, values, or indicators can be used with other transaction or non-transaction data of customers, either alone or with other derived values/calculations, to provide certain optimizations relating to relationship optimization.

26 Claims, 9 Drawing Sheets

(56) References Cited

U.S. PATENT DOCUMENTS

| | | |
|---|---|---|
| 8,073,767 B1 | 12/2011 | Trench et al. |
| 8,099,356 B2 | 1/2012 | Feinstein et al. |
| 8,140,399 B1 | 3/2012 | Goel |
| 8,145,535 B2 | 3/2012 | Goel |
| 8,145,536 B1 | 3/2012 | Goel |
| 8,165,920 B2 | 4/2012 | Goel |
| 8,194,830 B2 | 6/2012 | Chakraborty et al. |
| 8,199,901 B2 | 6/2012 | Rani et al. |
| 8,249,231 B2 | 8/2012 | Chakraborty et al. |
| 8,285,596 B2 | 10/2012 | Sharma |
| 2002/0023051 A1 | 2/2002 | Kunzle et al. |
| 2002/0116244 A1 | 8/2002 | Honarvar et al. |
| 2002/0194096 A1 | 12/2002 | Falcone et al. |
| 2002/0194117 A1 | 12/2002 | Nabe et al. |
| 2003/0200135 A1 | 10/2003 | Wright |
| 2004/0034558 A1 | 2/2004 | Eskandari |
| 2004/0039593 A1 | 2/2004 | Eskandari |
| 2004/0073520 A1 | 4/2004 | Eskandari |
| 2004/0093271 A1 | 5/2004 | Walker et al. |
| 2004/0111363 A1 | 6/2004 | Trench et al. |
| 2004/0139010 A1 | 7/2004 | McMichael et al. |
| 2004/0193537 A1 | 9/2004 | Knapp |
| 2005/0021456 A1 | 1/2005 | Steele et al. |
| 2005/0097028 A1 | 5/2005 | Watanabe et al. |
| 2005/0273430 A1 | 12/2005 | Pliha |
| 2005/0279824 A1 | 12/2005 | Anderson et al. |
| 2007/0106558 A1 | 5/2007 | Mitchell et al. |
| 2007/0124237 A1* | 5/2007 | Sundararajan et al. ......... 705/38 |
| 2007/0156673 A1 | 7/2007 | Maga et al. |
| 2007/0159481 A1 | 7/2007 | Abe et al. |
| 2007/0185867 A1 | 8/2007 | Maga et al. |
| 2007/0203827 A1 | 8/2007 | Simpson et al. |
| 2008/0021813 A1 | 1/2008 | Simpson et al. |
| 2008/0027749 A1 | 1/2008 | Meyer et al. |
| 2008/0052234 A1 | 2/2008 | Keohane et al. |
| 2008/0091530 A1 | 4/2008 | Egnatios et al. |
| 2008/0215377 A1 | 9/2008 | Wottowa et al. |
| 2008/0228511 A1 | 9/2008 | Barden |
| 2008/0249844 A1 | 10/2008 | Abe et al. |
| 2008/0275800 A1 | 11/2008 | Abe et al. |
| 2009/0018937 A1 | 1/2009 | Joao |
| 2009/0157449 A1 | 6/2009 | Itani et al. |
| 2009/0171756 A1 | 7/2009 | De Zilwa et al. |
| 2009/0171838 A1 | 7/2009 | Liu et al. |
| 2009/0190729 A1 | 7/2009 | Chakraborty et al. |
| 2009/0192809 A1 | 7/2009 | Chakraborty et al. |
| 2009/0198610 A1 | 8/2009 | Wu et al. |
| 2009/0222313 A1 | 9/2009 | Kannan et al. |
| 2009/0234710 A1 | 9/2009 | Belgaied Hassine et al. |
| 2009/0276289 A1 | 11/2009 | Dickinson et al. |
| 2009/0276368 A1 | 11/2009 | Martin et al. |
| 2009/0292583 A1 | 11/2009 | Eilam et al. |
| 2009/0307074 A1 | 12/2009 | Sharma |
| 2009/0327123 A1 | 12/2009 | Wolfson |
| 2010/0057548 A1 | 3/2010 | Edwards |
| 2010/0106585 A1 | 4/2010 | Etheredge et al. |
| 2010/0106589 A1 | 4/2010 | Etheredge et al. |
| 2010/0138282 A1 | 6/2010 | Kannan et al. |
| 2010/0161379 A1 | 6/2010 | Bene et al. |
| 2010/0179860 A1* | 7/2010 | Noel et al. ...................... 705/10 |
| 2010/0274687 A1 | 10/2010 | Ghosh et al. |
| 2010/0306091 A1 | 12/2010 | Homer et al. |
| 2010/0306094 A1 | 12/2010 | Homer et al. |
| 2010/0312679 A1 | 12/2010 | Lebouitz |
| 2011/0022454 A1 | 1/2011 | Lefebvre et al. |
| 2011/0029431 A1 | 2/2011 | Knapp |
| 2011/0131122 A1 | 6/2011 | Griffin et al. |
| 2011/0131130 A1 | 6/2011 | Griffin et al. |
| 2011/0131131 A1 | 6/2011 | Griffin et al. |
| 2011/0178908 A1 | 7/2011 | Benefield et al. |
| 2011/0191173 A1 | 8/2011 | Blackhurst et al. |
| 2011/0191180 A1 | 8/2011 | Blackhurst et al. |
| 2011/0246346 A1 | 10/2011 | Satyavolu et al. |
| 2011/0251874 A1 | 10/2011 | Banthia et al. |
| 2011/0295731 A1 | 12/2011 | Waldron et al. |
| 2011/0313835 A1 | 12/2011 | Falkenborg et al. |
| 2011/0313900 A1 | 12/2011 | Falkenborg et al. |
| 2012/0004969 A1 | 1/2012 | Satyavolu et al. |
| 2012/0004970 A1 | 1/2012 | Satyavolu et al. |
| 2012/0010933 A1 | 1/2012 | Satyavolu et al. |
| 2012/0022917 A1 | 1/2012 | Lawton et al. |
| 2012/0023009 A1 | 1/2012 | Pazlar et al. |
| 2012/0053972 A1 | 3/2012 | Lawton et al. |
| 2012/0078766 A1 | 3/2012 | Rose et al. |
| 2012/0109802 A1 | 5/2012 | Griffin et al. |
| 2012/0143735 A1 | 6/2012 | Pascal Leo et al. |
| 2013/0054334 A1 | 2/2013 | Ross et al. |
| 2013/0060669 A1 | 3/2013 | Rose et al. |
| 2013/0073386 A1 | 3/2013 | Rose et al. |

OTHER PUBLICATIONS

American Marketing Association, "How Merrill Lynch Optimizes Inbound Interactions with Real-Time Decisioning." 2010 Portrait Software Presentation, 28 pages.

"How Interaction Optimizer is changing the game at a major US investment management company." Portrait Software case study <www.portraitsoftware.com>. Nov. 2009, 2 pages.

"Aperio Uplift Optimizer for Signature." Fiserv, Inc. <www.signature.fiserv.com>, 2 pages.

"Aperio Customer Analytics for Signature." Fiserv, Inc. <www.signature.fiserv.com>, 4 pages.

"Aperio Interaction Optimizer for Signature." Fiserv, Inc. <www.signature.fiserv.com>, 2 pages.

Final Office Action for related U.S. Appl. No. 13/237,583 mailed Jul. 18, 2013.

Notice of Allowance for related U.S. Appl. No. 13/226,926 mailed Aug. 1, 2013.

Non-Final Office Action for U.S. Appl. No. 13/407,111 mailed Aug. 7, 2013.

Non-Final Office Action for related U.S. Appl. No. 13/407,102 mailed Nov. 15, 2012.

Final Office Action for related U.S. Appl. No. 13/407,102 mailed Apr. 12, 2013.

Grosman, Penny, "Mitek Offers Card Balance Transfer via Mobile Device", Sep. 8, 2011—2011 American Banker and SourceMedia, Inc.: http://www.americanbanker.com/issues/176_175/mitek-mobile-card-balance-transfer-1042000-1.html?.

Final Office Action for U.S. Appl. No. 12/893,822 mailed Feb. 27, 2013.

Non-Final Office Action for related U.S. Appl. No. 13/226,926 mailed Dec. 27, 2012.

Notice of Allowance for related U.S. Appl. No. 13/226,926 mailed Apr. 22, 2013.

Non-Final Office Action for U.S. Appl. No. 13/237,583 mailed Mar. 13, 2013.

* cited by examiner

SYSTEMS AND METHODS FOR CUSTOMER VALUE OPTIMIZATION INVOLVING RELATIONSHIP OPTIMIZATION

FIELD OF THE INVENTION

Aspects of the invention relate generally to analyzing transaction and non-transaction information of customers, and more particularly, to systems and methods for customer value optimization involving relationship optimization.

BACKGROUND OF THE INVENTION

Many financial institutions do not have the capability to determine how to allocate their resources to improve the value of or relationship with their current customers. In this way, many financial institutions would benefit from the ability to identify or target customers or associated products/services for customers that are likely to increase customer value or otherwise improve the customers' relationship with the financial institution. Accordingly, there is an opportunity for systems and methods for customer value optimization involving relationship optimization.

SUMMARY OF THE INVENTION

According to an example embodiment of the invention, there is a method. The method may include receiving data associated with a customer of a financial institution, the data associated with at least one of (i) financial transaction data of the customer, or (ii) financial account data of the customer; identifying one of a plurality of segments for the customer, wherein the identified segment is based at least in part on a first portion of the input data; calculating a current value of the customer, the current value based at least in part upon one or more current holdings of existing products or services by the customer with the financial institution; calculating a future value of the customer, the future value based upon a probability of purchase for at least one product or service and a measure of profitability for the at least one product or service, the measure of profitability identified based at least in part from the identified segment for the customer; and determining, based at least in part on a combination of the current value and the future value, that the customer is eligible for at least one recommended next action, wherein each recommended next action includes a new product or service for the customer or a modification to an existing product or service of the customer. One or more of the prior steps may be performed by one or more computers.

According to another example embodiment of the invention, there is a system. The system may include at least one memory comprising computer-executable instructions; at least one communications interface; and at least one processor in communication with the at least one communications interface and the at least one memory. The processor may be configured to execute the computer-executable instructions to: receive data associated with a customer of a financial institution, the data associated with at least one of (i) financial transaction data of the customer, or (ii) financial account data of the customer; identify one of a plurality of segments for the customer, wherein the identified segment is based at least in part on a first portion of the input data; calculate a current value of the customer, the current value based at least in part upon one or more current holdings of existing products or services by the customer with the financial institution; calculate a future value of the customer, the future value based upon a probability of purchase for at least one product or service and a measure of profitability for the at least one product or service, the measure of profitability identified based at least in part from the identified segment for the customer; and determine, based at least in part on a combination of the current value and the future value, that the customer is eligible for at least one recommended next action, wherein each recommended next action includes a new product or service for the customer or a modification to an existing product or service of the customer.

BRIEF DESCRIPTION OF THE DRAWINGS

Reference will now be made to the accompanying drawings, which are not necessarily drawn to scale, and wherein.

DETAILED DESCRIPTION

Figure 1:
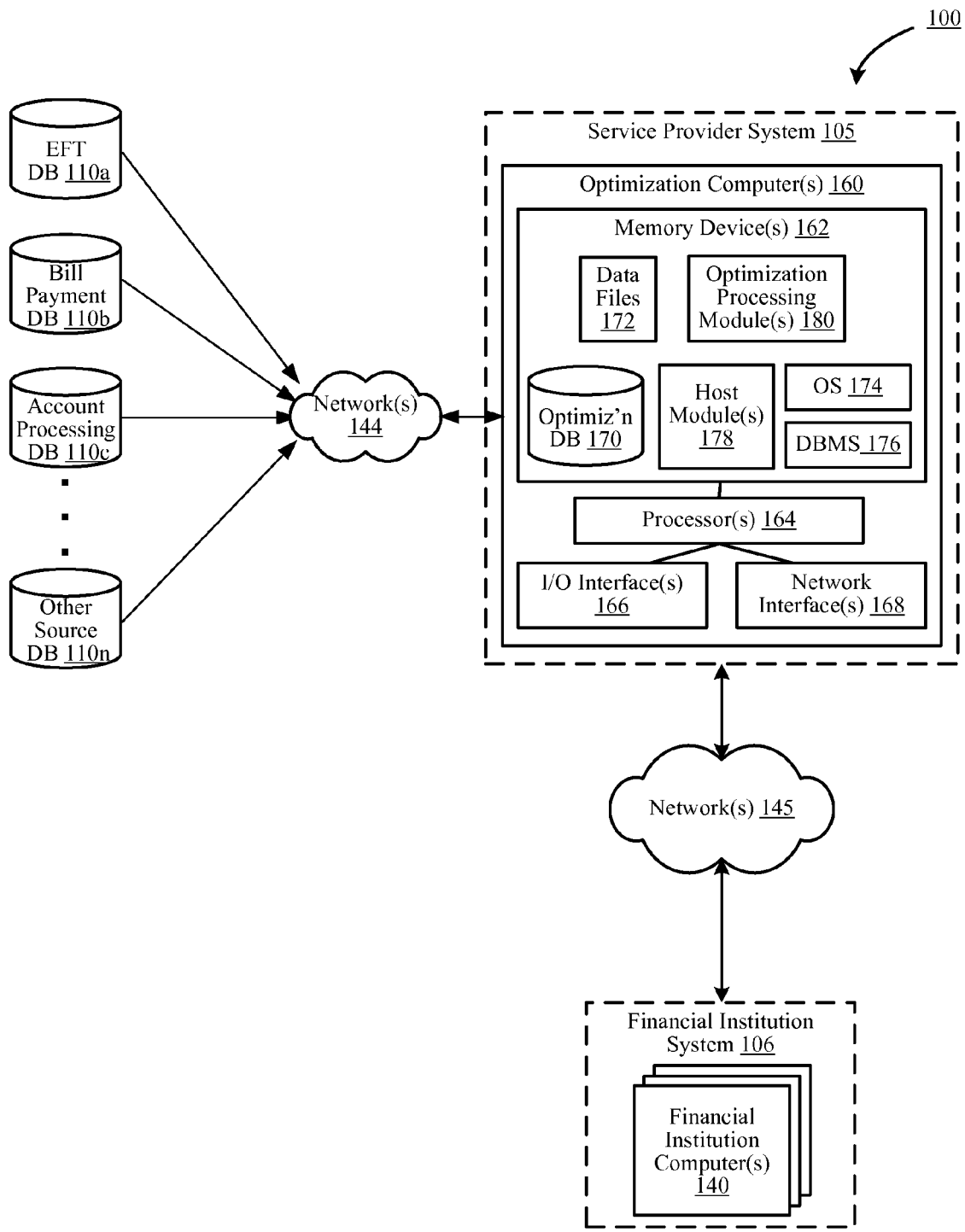
FIG. 1 illustrates a block diagram of an example system that supports one or more customer value optimization processes in accordance with an example embodiment of the invention.

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide systems and methods for customer value optimization. The customer value optimization can include analyzing certain transaction and/or non-transaction data of customers with one or more predictive models to determine predictive modeling scores, values, or indicators. These one or more predictive modeling scores, values, or indicators can be used with other transaction or non-transaction data of customers, either alone or with other derived values/calculations, to provide certain optimizations. An example aspect of the optimizations can be identifying customers to target with respect to a particular product or service offering that the financial institution wishes to promote. Alternatively, one or more products/services can be identified for use in targeting certain customers. In addition, other optimizations can identify certain offerings or configurations of products or services that can be offered to one or more customers in order to improve those customers' relationships with the financial institution.

It will be appreciated that the optimizations described herein, or at least a portion thereof, can be performed by a service provider, a financial institution, or a combination thereof on a periodic basis or on an as-requested basis, according to an example embodiment of the invention. As an example, the service provider may operate as an application service provider (ASP) that allows a user of a financial institution computer to identify or provide data of customers to be analyzed for optimizations, as well as any configuration options or preferences for performing the optimizations. The results of the optimizations can then be accessed by a financial institution computer communicating with the service provider via a network. For example, the financial institution can have customer management software that receives the results of the optimizations performed by the service provider. It will be appreciated that the service provider may provide optimization functionality to a plurality of financial institutions, according to an example embodiment of the invention. It will also be appreciated that the service provider can also be a unit of a financial institution that provides the optimization functionality to one or more units of the same, a subsidiary of the same, or other financial institution(s) via networked financial institution computers. Alternatively, the optimizations described herein may also be performed by optimization software running locally at a financial institution computer. In this regard, the financial institution computer can access, either locally or via a network, data for customers to be analyzed by optimizations, as well as any configuration options or preferences for performing the optimizations.

I. System Overview

FIG. 1 illustrates an example system 100 that supports one or more customer value optimization processes in accordance with an example embodiment of the invention. Although various computing devices and/or computers are illustrated in FIG. 1, it is appreciated that corresponding entities and/or individuals are associated with each of the computers illustrated. According to various embodiments, there may be: one or more service provider systems 105, each associated with one or more optimization computers 160, and one or more financial institution systems 106, each associated with one or more financial institution computers 140. According to various embodiments, there may be any number of each entity type, and each entity may be associated with any number of suitable computers, computing devices, and/or other devices. For simplicity, the computers, devices, and/or entities may be referenced in the singular, but it is appreciated that the same description applies to embodiments including multiple computers, devices, and/or entities. Similarly, for each of the computers described herein, it is appreciated that the computer may include any number of suitable components and/or functionality. Moreover, although detailed descriptions of system components are provided for the service provider system 105, it is appreciated that any of the financial institution systems 106 may be configured in any suitable manner, which may be similar to that described herein for the service provider system 105. In this regard, the financial institution computers 140 can include one or more memory devices, processors, input/output (I/O) interfaces, and network interfaces. The one or more memory devices may store computer-executable instructions, which may be accessed and executed by the one or more processors to provide the functionality described herein with respect to the financial institution computers 140.

As shown in FIG. 1, the service provider system 105 and the financial institution system 106 may be in communication with each other via one or more suitable networks 145, which, as described below, can include one or more separate or shared private and/or public networks, including the Internet or a public switched telephone network. In addition, the service provider system 105, including at least an optimization computer 160, can have access to one or more databases 110a-n or other storage of data via one or more networks 144, which may be the same as or different than networks 145. These components will now be discussed in further detail.

The service provider system 105 may include any number of optimization computers 160 that operate to receive certain transaction or non-transaction data of customers of one or more financial institutions, and further perform one or more optimizations based at least in part upon the received data of the customers. In addition, the one or more optimization computers 160 may communicate with any number of financial institution computers 140 to receive options, preferences, and/or constraints for performing one or more optimizations described herein, as well as to provide one or more results of the performed optimizations to any number of financial institution computers 140. An optimization computer 160 may be any suitable processor-driven device, such as, but not limited to, a server computer, a mainframe computer, one or more networked computers, a desktop computer, a personal computer, a digital assistant, a personal digital assistant, a digital tablet, an Internet appliance, an application specific circuit, a microcontroller, a minicomputer, or any other processor-based device. The execution of suitable computer-implemented instructions by the optimization computer 160 may form a special purpose computer or other particular machine that is operable to facilitate the processing of the optimizations, as well as the receipt and output of data associated with the optimizations. Although a single optimization computer 160 is described herein, the operations and/or control of the optimization computer 160 may be distributed among any number of computers and/or processing components.

In addition to having one or more processors 164, the optimization computer 160 may include one or more memory devices 162, one or more input/output ("I/O") interfaces 166, and one or more network interfaces 168. The memory devices 162 may be any suitable memory devices, for example, caches, read-only memory devices, random access memory devices, magnetic storage devices, removable storage devices, etc. Additionally, any number of logical data storage constructs may be stored as desired within the memory devices 162, such as any suitable database such as an optimization database 170. In addition or in the alternative, while databases 110a-n may be accessed via a network 144 in some embodiments, any of databases 110a-n may be stored within memory devices 162 without departing from example embodiment of the invention. The memory devices 162 may further store a wide variety of data, such as by data files 172. Additionally, the memory devices 162 may store executable instructions and/or various program modules utilized by the optimization computer 160, for example, an operating system (OS) 174, a database management system ("DBMS") 176, an optimization processing module 180 and/or one or more host modules 178.

The data files 172 and/or the optimization database 170 may include any suitable data that facilitates the receipt or processing of certain data utilized with or by the optimization processing, which may include options, preferences, and/or constraints to be utilized with the optimization processing, as well as one or more results of any performed optimization processing. For example, the data files 172 and/or optimization database 170 may include data derived or received from databases 110*a-n*, any options, preferences or constraints received from one or more financial institution systems 106, as well as processing results from the performed optimizations that are made available to one or more financial institution systems 106. The optimization processing module 180 may store predictive models, calculation algorithms, processing logic, and/or business rules utilized to perform one or more optimizations. In some example embodiments, the optimization processing module 180 may store processing logic, business rules, and/or other software that is less prone to change over time, while other logic, rules, predictive models, and/or calculation algorithms that are more likely to change or be modified may be stored in data files 172 and/or optimization database 170. Many variations of the optimization database 170, data files 172, and/or optimization processing module 180 are available in accordance with example embodiments of the invention. It is appreciated that the illustration of an optimization database 170 as a separate database from the data files 172 and/or any other data storage means is provided for illustrative purposes, and that any data may be stored in any arrangement, separate or together with other data stored by the optimization computer 160.

The operating system ("OS") 174 may be a suitable software module that controls the general operation of the optimization computer 160. The OS 174 may also facilitate the execution of other software modules by the one or more processors 164, for example, the optimization processing module 180 and/or the host module(s) 178. The OS 174 may be, but is not limited to, Microsoft Windows®, Apple OSX™, Linux, Unix, or a mainframe operating system. The host modules 178 may include any number of suitable host modules that manage interactions and communications between the service provider system 105 and external systems, such as financial institution system 106 (e.g., financial institution computer 140). In this regard, the host module 178 can interface with other modules such as optimization processing module 180 in order to facilitate the receipt of data from databases 110*a-n*, as well as options, preferences, and/or constraints from financial institution system 106; and manage requests from one or more financial institutions to perform one or more optimizations and/or requests to receive one or more results from the performed optimizations. Additionally, in certain embodiments, the host modules 178 may be configured to generate and/or to present a wide variety of different interfaces and/or graphical user interfaces, such as one or more interfaces that facilitate the receipt of data and/or requests from, or a presentation of results or other information to the financial institution system 106 and/or service provider system 105. An interface can be in the form of one or more browser-based or Internet-based webpages, although interfaces can also be presented through specialized software programs (e.g., stand-alone application, applet, mobile device application, etc.), according to an example embodiment of the invention. It will be appreciated that the interface can be formatted for display on a mobile device (e.g., personal communications device like a BlackBerry, iPhone, etc.) or non-mobile device (e.g., desktop computer, server computer, etc.), according to an example embodiment of the invention. The interface may be associated with security settings to enable access by certain registered users of the service provider system 105 and/or financial institution system 106. As desired, a private interface may be branded in accordance with specifications and/or preferences of a partner entity.

Additionally, as desired in certain embodiments, the host modules 178 may be configured to provide a web services interface layer to another entity or component of the system 100.

The optimization processing module 180 may be operable, configured, and/or programmed to receive data from optimization database 170 or data files 172 to calculate certain predictive modeling scores and/or computational values, to perform one or more optimizations based at least in part on the predictive modeling scores and/or computational values, and to provide one or more results of the performed optimizations. Additional details of the operations of the optimization processing module 180 and/or service provider system 105 operating logic and functionality are provided below with reference to FIGS. 2-8.

With continued reference to the optimization computer 160, the one or more I/O interfaces 166 may facilitate communication between the optimization computer 160 and one or more input/output devices; for example, one or more user interface devices, such as a display, keypad, mouse, pointing device, control panel, touch screen display, remote control, microphone, speaker, etc., that facilitate user interaction with the optimization computer 160. The one or more network interfaces 168 may facilitate connection of the optimization computer 160 to one or more suitable networks, for example, the network(s) 144, 145 illustrated in FIG. 1, or local area network(s) within the service provider system 105. In this regard, the optimization computer 160 may receive and/or communicate information to other components of the system 100, databases 110*a-n* (either directly or via one or more computers managing databases 110*a-n*) and financial institution systems 106. As desired, any number of webpages, interface screens, and/or other presentations (e.g., graphical user interfaces, etc.) may be provided or presented to a financial institution system 106 via the network 145.

The databases 110*a-n* can provide a variety of transaction and non-transaction data associated with customers that are to be optimized in accordance with the optimization processes described herein. In an example embodiment of the invention, the databases 110*a-n* may include one or more of an electronic funds transfer (EFT) database 110*a*, a bill payment database 110*b*, an account processing database 110*c*, and one or more other source databases 110*n*. In an example embodiment of the invention, each of databases 110*a-n* may include the following information illustrated below.

EFT database 110*a*
  Debit card transaction data
    i. Transaction type: May indicate a debit (e.g., a purchase) or credit (e.g., a return) transaction. May also indicate whether the transaction is a signature-based transaction (e.g., via credit card network) or a PIN-based transaction (e.g., via an EFT or ATM network).
    ii. Transaction channel: Point of sale, online, etc.
    iii. Merchant identification: May identify a merchant by name or other identifier. May also identify a category for the merchant (e.g., grocery, drug store, restaurant, gas station, etc.).
    iv. Transaction date: Indicates a date for the transaction.
    v. Purchase (e.g., debit) or refund (e.g., credit) amount
  Automated Teller Machine (ATM) transaction data
    i. Transaction type: May indicate a deposit transaction, a withdrawal transaction, a balance inquiry transaction, or another type of transaction.
    ii. ATM identification/location: May identify the particular ATM by location (e.g., address) or other identifier.
    iii. Transaction channel: ATM iv. Transaction date: Indicates a date for the transaction.
v. Withdrawal amount or deposit amount
vi. Current account balance
Non-transaction data
i. Customer identification (e.g., name, social security number, address, telephone number, email address, and other contact information etc.)
ii. Customer demographic information (e.g., age, sex, occupation, etc.)
iii. Account establishment date: Establishment date for deposit account underlying the debit card transaction data and/or ATM transaction data
iv. Date of issuance of debit card or other transaction card
v. Contact/communication preferences (e.g., paper mailing, email, etc.).

Bill payment database 110b
Bill payment transaction data
i. Transaction type: Debit (e.g., payment to payee) or credit (e.g., from payee)
ii. Transaction channel: Online, in-person, telephone, etc. In addition, the particular user interface can be specified for some transaction channels. For example, for an "online" transaction channel, there may be a further specification of whether the transaction originated from a website or application of a particular financial institution or service provider. Likewise, the online transaction channel can also indicate whether a mobile device or associated mobile application was utilized.
iii. Bill payment date
iv. Bill payment amount
v. Payee identifier: Identifies the payee of the bill payment transaction.
vi. Source account: Indicates the source account (e.g., credit card, debit card, deposit account, etc.)
vii. Number of failed bill payment transactions
viii. Amount(s) of failed bill payment transactions
ix. Date of failed bill payment transactions
Non-transaction data (e.g., account data)
i. Customer identification (e.g., name, social security number, address, telephone number, email address, and other contact information etc.)
ii. Customer demographic information (e.g., age, sex, occupation, etc.)
iii. Bill payment enrollment date: Date that the customer enrolled for bill payment services. If a customer enrolled for bill payment services in conjunction with opening a bank account, this bill payment enrollment date may be the same as the bank account establishment date.
iv. Contact/communication preferences (e.g., paper mailing, email, etc.).

Account processing database 110c
Deposit account transactions
i. Transaction type: May indicate a deposit or withdrawal.
ii. Transaction channel: May indicate whether the deposit or withdrawal involves teller, ATM, telephone, online (Internet), or point of sale. In addition, the particular user interface can be specified for some transaction channels. For example, for an "online" transaction channel, there may be a further specification of whether the transaction originated from a website or application of a particular financial institution or service provider. Likewise, the online transaction channel can also indicate whether a mobile device or associated mobile application was utilized. The transaction channel can also be used to indicate internally generated transactions such as those associated with late fees charged, charging of interest, crediting of interest, etc., according to an example embodiment of the invention.
iii. Merchant identification: Identifies any merchant involved in the deposit or withdrawal transaction. The merchant can be identified by a merchant name or other identifier. May also identify a category for the merchant (e.g., grocery, drug store, restaurant, gas station, etc.)
iv. Transaction date: Indicates a date for the transaction.
v. Deposit or withdrawal amount
vi. Current account balance Loan product
i. Loan product type (e.g., fixed rate mortgage, adjustable rate mortgage (ARM), home equity line of credit (HELOC), etc.)
ii. Loan product term
iii. Loan product open date
iv. Loan product opening balance
v. Loan product current balance
vi. Loan product monthly payment
vii. Loan product interest rate
viii. Delinquency period: 30 days, 60 days, 90 days, 120 days, etc.

Time deposit
i. Time deposit product type (e.g., certificate of deposit (CD), bond, Treasury note, etc.)
ii. Time deposit opening amount
iii. Time deposit current amount
iv. Time deposit interest rate
v. Time deposit term
vi. Time deposit open date
vii. Whether any early redemption/partial distribution has occurred, and any associated redemption/distribution date and/or amount.

Non-transaction data (e.g., account data)
i. Customer identification (e.g., name, social security number, address, telephone number, email address, and other contact information etc.)
ii. Customer demographic information (e.g., age, sex, occupation, etc.)
iii. Account establishment date
iv. Contact/communication preferences (e.g., paper mailing, email, ATM, teller, telephone, etc.).

Other source database 110n
Transaction and non-transaction data from a variety of other financial institutions and affiliated institutions, including credit card institutions, credit reporting agencies, loan providers/servicers, and the like.
Other transaction data and non-transaction data relating to investment products, insurance products, and other banking/financial institution products.

It will be appreciated that the transaction data and/or account data for one or more of respective databases 110a-n can be grouped according to time period, according to an example embodiment of the invention. For example, for account processing database 110c, the January to March transaction data can be combined to determine trends. Indeed, the grouping of the data according to time periods can enable one or more of the predictive models or computations to be calculated per time period such that differences or movements between time periods can be evaluated, according to an example embodiment of the invention.

Although not described or illustrated in detail, each financial institution computer 140 may be configured in the same or similar manner as described for the service provider system 105. For example, financial institution computer 140 may include one or more processor-based computers operable to store and execute computer-executable instructions, each having one or more processors, memories, I/O interfaces, network interfaces, operating systems, data files, databases or other data storage means, DBMS, host modules and other operating logic to perform some or all of the same or similar functions as are described herein with reference to the service provider system 105 (e.g., optimization computer 160).

The networks 144, 145 may include any number of telecommunication and/or data networks, whether public, private, or a combination thereof, including but not limited to, the Internet, a local area network, a wide area network, an intranet, intermediate handheld data transfer devices, public switched telephone networks, and/or any combination thereof and may be wired and/or wireless. The networks 144, 145 may also allow for real-time, off-line, and/or batch transactions to be transmitted thereover. Due to network connectivity, various methodologies described herein may be practiced in the context of distributed computing environments. Although the system 100 is shown for simplicity as including networks 144, 145, it is to be understood that any other network configuration is possible, which may optionally include a plurality of networks for each of networks 144, 145, each with devices such as gateways and routers, for providing connectivity between or among networks.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the invention should not be construed as being limited to any particular operating environment, system architecture, or device configuration.

II. Operational Overview

Figure 2:
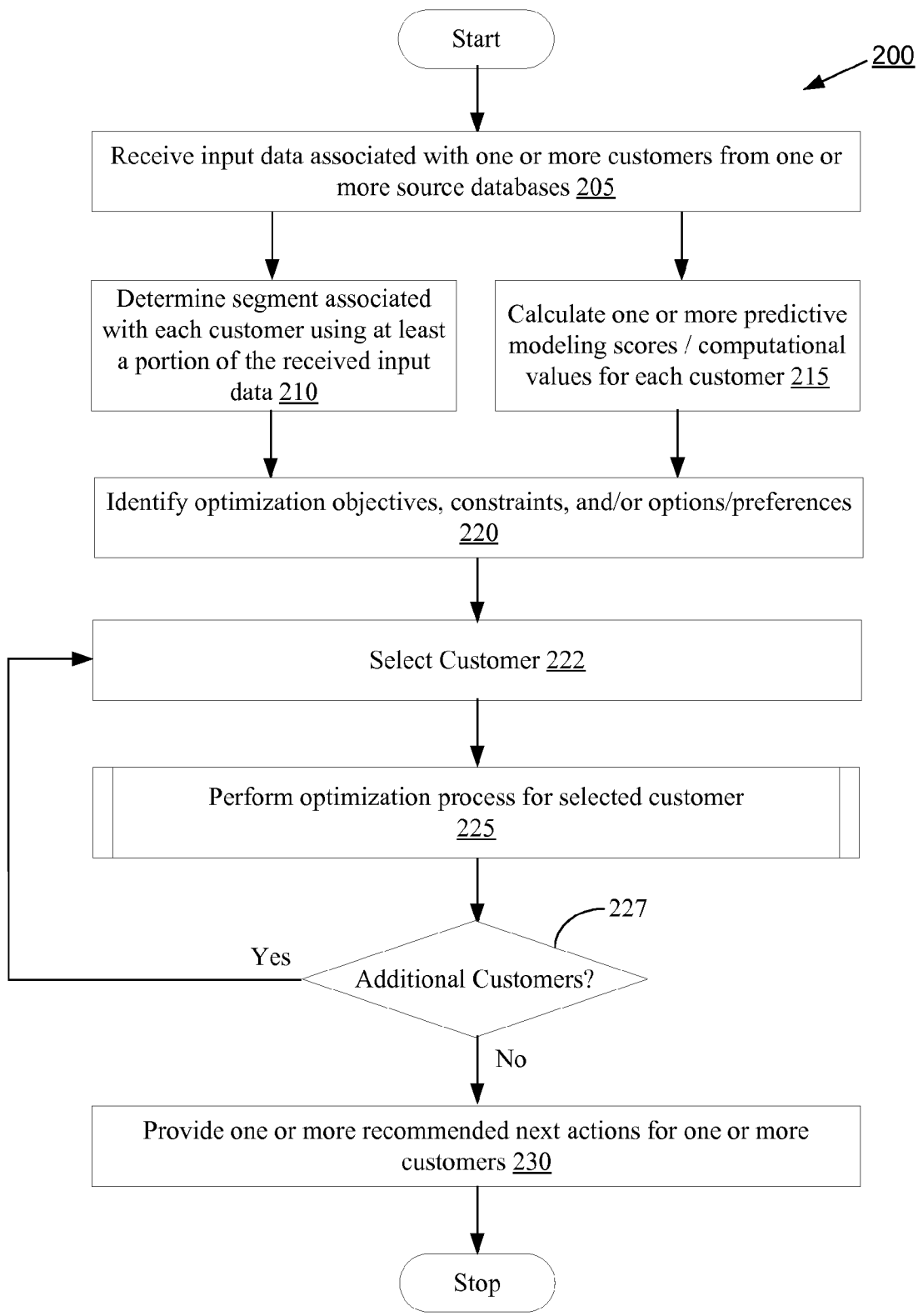
FIG. 2 illustrates a flow diagram for an example process for performing one or more optimization processes, according to an example embodiment of the invention.

FIG. 2 illustrates a flow diagram 200 for an example process for performing one or more optimization processes, according to an example embodiment of the invention. Starting at block 205, the optimization computer 160 can execute the optimization processing module 180, either alone or in conjunction with host module 178, to access, request, or receive input data from one or more of databases 110*a-n* via one or more networks 144. It will be appreciated that the data can be received on a periodic basis, or on an as-requested basis, according to an example embodiment of the invention. As an example, at least a portion of the transaction data and the non-transaction data of any EFT database 110*a*, bill payment database 110*b*, account processing database 110*c*, or any other source databases 110*n* may be received by the optimization computer 160. Accordingly, respective transaction data can be received for customers from one or more of respective databases 110*a-n*. Likewise, non-transaction data may be received for each customer from databases 110*a-n*, perhaps packaged in a respective customer information file (CIF) from respective databases 110*a-n*. The transaction data and non-transaction data may each include customer identification information, or otherwise be received in a respective data package for a respective customer, such that the received data can be sorted, identified, or segregated on a customer-to-customer basis.

As described above, the transaction data may identify, for each transaction, a transaction type (e.g., deposit, credit, bill payment, etc.), a transaction date, a transaction channel, a transaction amount, and/or a merchant/payee identification associated with the transaction. The non-transaction data, which may be received in one or more CIFs, may include data that is not transaction dependent, such as the customer identification, customer date of birth, identification of the type of account, and/or a date that the account was opened. It will be appreciated that the data received from databases 110*a-n* for one or more customers may correspond to data from a single financial institution or data from multiple financial institutions without departing from example embodiments of the invention.

Still referring to block 205, the data received from one or more of databases 110*a-n* may be normalized and/or converted, according to an example embodiment of the invention. As an example, since databases 110*a-n* may store information in various disparate formats, it may be necessary to normalize the received data such the data is provided in a standardized format or an expected format according to an example embodiment of the invention. In this way, normalization can allow data to be received from virtually any number of databases associated with any financial or non-financial institutions that may manage the databases in different ways.

Normalization can ensure that data from databases 110*a-n* (e.g., customer identification, transaction type, transaction channel, etc) is provided in a common, predefined format (e.g., number of characters/numbers, spacing, etc.), and converted to be within an expected range if appropriate. The normalization process, which includes providing data in a common format and/or converting data, may also include performing simple counts, averages, or basic mathematical operations to derive certain basic values that may not be directly specified from the data received from one or more databases 110*a-n*. In this regard, one or more of the following example values may be derived as part of, or in conjunction with, the normalization or converting process:

Transaction counts: A count of the number of transactions of a certain type for one or more customer accounts within a time period
  Debit transaction count
  Credit transaction count
  Check transaction count
  Point-of-sale transaction count
  Online transaction count
  Teller-assisted transaction count
  Telephone-assisted transaction count
  PIN-based card transaction count
  Signature-based card transaction count
Product/service counts: Number of product/services of the customer across one or more customer financial institutions
  Debit card account count
  Credit card account count
  Count of number of loans
  Count of number of deposit accounts (e.g., any of checking accounts, savings accounts, money market accounts, etc.)
  Time deposit product count (e.g., count of certificate of deposit accounts)
Average amounts: An average of certain amounts across one or more customer accounts within a time period
  Average mortgage payment amount
  Average loan payoff amount Average balance across one or more debit cards, credit cards, loan products, time deposit accounts, deposit accounts, etc.

Average debit transaction amount

Average deposit transaction amount

Average check amount

Percentage amounts: Percentage calculations across one or more products of the customer within a time period. Alternatively, the percentages can also be expressed as ratios without departing from example embodiments of the invention.

Percent of online transactions compared to transactions of a set of channel types (e.g., online transactions, telephone transactions, and in-person transactions, etc.)

Percent of PIN-based point of sale (POS) transactions compared to transactions of a set of channel types (e.g., PIN-based POS transactions and signature-based POS transaction).

Percent of signature-based POS transactions compared to transactions of a set of channel types.

Percent of teller-assisted transactions compared to transactions of a set of channel types.

Differences over a period of time: Can be expressed as a mathematical difference or a ratio/percentage (e.g., (final balance—initial balance)/initial balance).

Change in balance from one time period to another.

Change in transaction count from one time period to another.

Change in number of accounts from one time period to another.

These and other counts, averages, or basic mathematical operations may be performed at block 215 without departing from example embodiments of the invention. However, it will be appreciated that one or more of these counts, averages, or other basic mathematical operations may also be performed as part of another subsequent block such as block 215 as well.

Still referring to block 205, the data received from one or more databases 110*a*-*n*, including any values computed as part of, or in conjunction with, the normalization or converting process, may be stored in an optimization database 170 and/or data files 172 for subsequent access, according to an example embodiment of the invention. It will be appreciated that the stored data in the optimization database 170 and/or data files 172 can identify a respective plurality of customers, and corresponding transaction data and non-transaction data for each of the plurality of customers. It will also be appreciated that different types of data can be obtained by or otherwise received in database 170 and/or data files 172 according to various timings, according to an example embodiment of the invention. For example, transaction data from any of databases 110*a*-*n* may be obtained by or otherwise received in database 170 and/or data files 172 daily (perhaps on weekdays); on the other hand, non-transaction data from any of databases 110*a*-*n* may be obtained by or otherwise received in database 170 and/or data files 172 on a weekly or monthly basis, or perhaps, only when a change in the non-transaction data has occurred, according to an example embodiment of the invention.

Following block 205 are blocks 210 and 215, which may be performed in parallel, according to an example embodiment of the invention. However, in some example embodiments, the segmentation process of block 210 may be performed prior to block 215 where the segment of a customer may be needed for calculating certain predictive modeling scores or computational values at block 215.

Turning now to block 210, a segmentation process can be performed for each customer using the stored data in optimization database 170 and/or data files 172. In general, segmentation may be a process for separating a population of customers into different groups—that is, "segments"—that are expected to share one or more common characteristics or attributes. Accordingly, the transaction and/or non-transaction data may be processed or analyzed by the optimization computer 160 executing the optimization processing module 180 to separate the plurality of customers into respective segments. Each customer is typically assigned to a single segment, although in alternative embodiments, it is possible for a customer to be assigned to two or more segments. For example, a micro-segmentation approach may include many segments with respective limited attributes, such that a customer is expected to be assigned to a plurality of micro-segments, according to an example embodiment of the invention. It will be appreciated that the number and identity of respective segments can be defined by a service provider, a financial institution, and/or a combination thereof. Segmentation for customers may be utilized by the optimization processing module 180 in order to reduce the number of false positives that may occur based otherwise on individual consideration of each customer, according to an example embodiment of the invention. Accordingly, the optimization processes described herein may be tailored towards certain segments of customers. However, it will be appreciated that segmentation may not necessarily be utilized with or required with the optimization processes in alternative embodiments of the invention.

Table I below identifies several example segments that may be possible in accordance with example embodiments of the invention. It will be appreciated that the names and attributes of the example segments below are provided for illustrative purposes only and that many variations are available without departing from example embodiments of the invention. Likewise, the number of available segments in a set of segments can be varied in accordance with example embodiments of the invention.

TABLE I

| Segment Number | Example Segment Description | Example Characteristics or Attributes |
| --- | --- | --- |
| Segment #1 | Branch Centric Churners | Primary channel is in-person at a particular branch of a financial institution. Rarely or never utilizes online services, and receives most correspondences via paper mailing. Branch centric churners may have the highest risk of attrition and the highest cost to service compared to other segments. Many branch centric churners are single-service customers. These branch centric churners may be risky in terms of DDA charge-offs. High incidence of non-Sufficient Funds (NSF—items returned to payee) and overdraft (with item being paid). |
| Segment #2 | Cash Constrained Borrowers | Cash constrained borrowers may be characterized as multi-channel users, but who prefer in-person banking. These cash constrained borrowers have both deposit and lending relationships with the financial institution; however, they are more likely than other customer segments to experience delinquencies and charge-off (on the lending side), and to experience higher than average NSF/Overdrafts (deposit side). Cash constrained borrowers may be multi-product households, but may not utilize online banking services or utilize electronic payments (debit cards). |
| Segment #3 | Engaged Loyalists | Engaged loyalists may be characterized by very deep deposit and lending product relationships with the financial institution, with very high balances in each deposit or lending product. |

TABLE I-continued

| Segment Number | Example Segment Description | Example Characteristics or Attributes |
|---|---|---|
| | | These engaged loyalists may be highly engaged with the financial institution using branches, online banking, electronic bill pay, debit cards and other ancillary services. The engaged loyalists may be the most profitable segment as well, as they have low risk of attrition, loan delinquencies, or charge-offs. |
| Segment #4 | Young Digerati | Young Digerati may be characterized by very high transaction levels across all electronic channels, with very few transactions at branch offices. The Young Digerati may also be heavy ATM/POS users. Balances for Young Digerati may be "average" compared to other segments and the depth of the relationship with the financial institution is moderate. There may be a moderate risk of attrition for Young Digerati. |
| Segment #5 | Relationship Agnostic | The Relationship Agnostic may include financial consumers with above average risk of attrition, and low-engagement with financial institution. The Relationship Agnostic may have a very limited number of products and services used at the financial institution. The Relationship Agnostic may be price sensitive on the lending side, and fee sensitive on the deposit side. |

As another example, alternate segments can be utilized. These segments may indicate a likelihood of a customer being persuaded to respond to marketing efforts in a general sense. In this scenario, the segments can include those that are (1) persuadable, (2) would buy in any event, thus, not requiring much or any persuading, (3) would never buy, or (4) would be prone to annoyance so that a marketing effort may backfire. In yet another example, the segments may divide those customers who are technologically proficient and those who are not. In still yet another example, the segments can divide customers by income levels and/or asset levels. Many variations of segments are available without departing from example embodiments of the invention.

Still referring to block 210, an example K-means algorithm may be utilized as the segmentation process to determine which segment a customer should be assigned to. It will be appreciated that the example K-means algorithm may be a "directed" or "supervised" method of clustering because the number of clusters—in this case, segments—may be specified by a user. However, non-directed or self-organizing algorithms (e.g., Kohonen Neural Net) may also be utilized for the segmentation process without departing from example embodiments of the invention.

An example K-means algorithm is illustrates as follows:

$$J = \sum_{j=1}^{k} \sum_{X_n \in S_j} \|X_n - \mu_j\|^2,$$

where J is the calculated K-means distance; j is an index value from 1 to k; and $S_j$ refers the set of segments $\{S_1, S_2, \ldots, S_k\}$, which includes a plurality of segments $S_1$ to $S_k$. In addition, mean $\mu_j$ is the mean of points for a segment $S_1$, and vector $X_n$ may be defined as a vector of variables of each customer, including, but not limited to, one or more of: number of accounts, account balances, number of transactions, channel used, frequency of channel usage, preference for certain channels, risk (e.g., risk of default/risk of non-sufficient funds (NSF)/risk of overdrawing (OD) account/Attrition risk, etc.), purchase and spending behavior, etc. It will be appreciated that the variables included within $X_n$ may be selected based upon their known or expected ability to contribute to meaningful segmentation results, according to an example embodiment of the invention.

The K-means algorithm may follow an iterative process. First, when the customer variables are considered for all of the segments such that the K-means distance J is calculated for each segment, each customer will be assigned to the segment in which the K-means distance J is the smallest value compared to the K-means distances J for the other segments. In other words, each segment may be represented by a respective centroid having a mean $\mu_j$. The respective variables for the customers will place respective customers within a respective distance of the mean $\mu_j$ for a centroid of a segment. Following the assignment step, a new mean $\mu_j$ may be calculated for each centroid based upon the respective variables for customers assigned to the centroid, and the process above may be repeated until the customer assignments to each centroid (and thus, the segment) no longer change.

It will be appreciated that the K-means algorithm is only an example algorithm that can be utilized for block 210, and that other algorithms can be utilized for the segmentation without departing from example embodiments of the invention.

Turning now to block 215, one or predictive modeling scores and/or computational values may be calculated for each customer that may be the subject of one or more optimization processes. It will be appreciated that the particular modeling scores and/or computational values that are calculated may be based upon the scores or values required by or otherwise specified by the algorithms for the supported optimization processes according to an example embodiment of the invention. However, it will be understood that many other modeling scores and/or computational values are possible, as desired or required, in accordance with example embodiments of the invention.

In an example embodiment of the invention, many computational values can be calculated for each customer based upon the transaction data available for each customer, which is either available from data in the optimization database 170 or data files 172, or otherwise computed or derived from such stored data. For example, as illustrated below, one or more of the following example predictive modeling scores or example computational values may be calculated for each customer at block 215.

Predictive Modeling Scores
Probability/propensity to buy financial product or service: A probability that a customer will purchase a particular product or enroll in a particular service.
Next most likely financial product or service: The product or service having the highest "probability/propensity to buy" within a set of products/services.
Attrition risk: Probability that the customer will close primary account or terminate a service (e.g., Bill Pay) with the financial institution within X days.
Computational Values
Current value (of customer): A monetary measure of value of a customer for all current products or services that the customer has with a financial institution.
Future value (of product or service): A monetary measure of anticipated profitability of a customer for a future product or service with a financial institution.

Future Value (of Customer): A monetary measure of anticipated profitability of a customer for all future products or services with a financial institution.

Share of Wallet: Financial institution's share of bill payments or transfer for a customer (compared to all bill payments of the customer or total transfers).

Value at Risk: Future monetary value of customer that potentially could be lost.

Table II below illustrates example algorithms that may be utilized to generate the predictive model scores or computational values described above. It will be appreciated that these example algorithms for the predictive models or computations may have been derived in a prior analytics/modeling process, prior to their utilization at block 215. In this regard, the prior analytics/modeling process for at least some of the algorithms may have involved a two-part process. In a first of the two-part process, a statistical modeler may obtain historical data, including transaction data and non-transaction data, from a variety of different sources, and including any of databases 110*a-n*. It will be appreciated that the data sources from which historical data may be received may include data sources beyond those that are available for use with block 215. In this regard, the data sources for the historical data may be from a number of financial institutions or non-financial institutions. Based upon the historical data, the statistical modeler can then identify those variables from the historical data that may appear to be predictive. Once the statistical modeler identifies the potentially predictive variables, the statistical modeler can then use one or more statistical tools (e.g., SAS) to produce, refine, or train the algorithm predictive model or computation. For example, the statistical tool may indicate one or more variables that should not be included in the algorithm, and likewise provide one or more weightings for those variables that will be included in the algorithm. It will be appreciated that the algorithms utilized for the predictive models and/or computations may be represented in a wide variety of formats involving equations, matrices, and the like, according to an example embodiment of the invention. Likewise, the algorithms for any of the predictive models and/or computations can be modified or updated on a periodic basis, or on an as-needed basis, according to an example embodiment of the invention. It will be appreciated that many variations of the algorithms for the predictive models or computations shown in Table II are available without departing from example embodiments of the invention.

TABLE II

| Predictive Modeling Score or Computational Value | Algorithm |
|---|---|
| Probability/Propensity to buy Product or Service (e.g., a Financial Product or Service) | $\Pr(\text{Product}_i/\text{Service}_i) = \dfrac{e^{z_i}}{e^{z_i}+1}$, where: $z_i = \beta_0 + \beta_k X_i$ $i = (\text{customer 1, customer 2, ... customer n})$; $z_i$ = the probability that customer i purchases the product or service in next N days; and $X_i$ is a vector of variables for each customer. As an example, for certificate of deposit (CD) product, the vector of variables may include the number of direct deposits within a certain number of months, average account balance, etc. As another example, for a loan product, the vector of variables $X_i$ may include debit transaction count, ATM debit amount, point of sale count over a certain number of months, Mortgage Payment Amount, Loan Payments Count, Time Deposit Count, Loan Payoff Amount over 6 months, Irregular loan payment amount, Point of Sale Debit over a certain number of months, failed bill payment Amount, Percent of PIN-based Point of Sale transactions, and/or Percent of Online Transactions. It will be appreciated that these and other variables may be selected based upon an expected contribution to the predictive nature of the Probability/Propensity to buy Financial Product or Service. According to an example embodiment, the weighting factors $\beta_0$, $\beta_k$ utilized for $z_i$ may be determined using statistical analysis (e.g., one or more regressions) on a set of historical data involving the vector of variables $X_i$. In this regard, an actual historical probability $z_i$ (the probability of purchase) is known for a customer based upon the historical data. In this way, the weighting factors $\beta_0$, $\beta_k$ can be determined using statistical analysis in order to fit the variables $X_i$ to a known probability, according to an example embodiment of the invention. |
| Next Most Likely Financial Product or Service | First calculate the "probability/propensity to buy" values for a set of products/services. Then, select product/service having the highest probability from the set of products/services based upon respective probability/propensity to buy values. |
| Current Value (of Product or Service) | Current Value = ((Current Product or Service Balance) * (Profitability Value)) − Cost Value<br>In an example embodiment of the invention, the Current product or service balance is typically available for a customer based upon the stored data in database 170 or data files 172. The profitability value may be based upon analysis of a product or service profitability across a population. For example, the profitability value may be based upon at least a revenue assumption or value known as a net interest margin (NIM). As another example, the profitability value may be an industry benchmark value (e.g., a NIM value) that is obtained from an external entity and stored for subsequent access in database 170 or data files 172. The profitability value, which is associated with a particular product or service, may apply to all customers, or may apply only to customers in a particular customer segment. The profitability value can also include or account for fees and services charges paid by the customer.<br>The cost value indicates a cost assumption associated with acquiring or servicing the product or service. In an example embodiment of the invention, the cost value may be based upon analysis of the product or service costs, perhaps across a population of a particular financial institution. The cost value of a product or service may be further dependent on the customer segment because the cost value of a product or service may differ from one customer segment to another; |

TABLE II-continued

| Predictive Modeling Score or Computational Value | Algorithm |
|---|---|
| | however, the cost value can be independent of the customer segment as well. In an alternative embodiment of the invention, the cost value may also be an industry benchmark value that is obtained from an external entity and stored for subsequent access in database 170 or data files 172. |
| Current Value (of Customer) | Current Value (of Customer) = Summation for respective current values for all products or services for the customer, as follows: $$CV_i = \sum_{j=1}^{M} V_{ij}^c,$$ where i = customer 1, customer 2 . . . , customer n; j = product 1, product 2, . . . , product M for customer i; and $V_{ij}^c$ is the current value of product j for customer i, according to an example embodiment of the invention. |
| Future Value (of Product or Service) | Future Value = (Probability/Propensity to Buy Product or Service) * Projected Balance as derived from the segmentation * Net Interest Margin Projected Value x (1 – Attrition Risk)) – Projected Cost Value<br>The Probability/Propensity to Buy Product or Service, as well as the Attrition Risk, may be calculated as described herein. The Projected Balance may be based upon analysis of historical balance of a population of customers, perhaps on a customer segment-by-customer segment basis, for a particular financial institution. In this regard, a respective Projected Balance may be available for each customer segment.<br>The Projected Cost value may be associated with a cost of acquiring or servicing the future product or service. The Projected Cost value can also be based upon analysis of historical cost information for a population of customers, perhaps on a customer segment basis, for a particular financial institution. However, it will be appreciated that the Projected Balance and Projected Cost Value can also be determined independent of a customer segment as well.<br>The Net Interest Margin Projected Value may generally be a measure of revenue or profitability (e.g., expressed as a percentage to be applied to a balance); it will be appreciated that other measures of revenue or profitability can be utilized instead of simply a net interest margin. The Net Interest Margin Projected Value (or other measure of profitability) may be an industry benchmark value that is obtained from an external entity and stored for subsequent access in database 170 or data files 172. Accordingly, the Net Interest Margin Projected Value may not be based upon customer data of the particular financial institution. However, it will be appreciated that in an alternative embodiment, the Net Interest Margin Projected Value may be determined based upon analysis of historical net interest margins or other measures of profitability for a population of customers, perhaps on a customer segment by customer segment basis. However, it will be appreciated that |
| | the Net Interest Margin Projected Value can also be determined independent of a customer segment as well. |
| Future Value (of Customer) | Future Value (of Customer) = Summation for respective future values for all products or services for the customer, as follows: $$FV_i = \sum_{j=1}^{M} V_{ij}^f,$$ where i = customer 1, customer 2 . . . , customer n; j = product 1, product 2, . . . , product M for customer i; and $V_{ij}^f$ is the future value of product j for customer i. |
| Attrition Risk | $$\Pr(\text{Attrition}) = \frac{e^{z_i}}{e^{z_i} + 1}$$ $z_i = \beta_0 + \beta_k X_i$, where: <br>i = (customer 1, customer 2, . . . customer n); $z_i$ = the probability that customer i attrites (e.g., leaves financial institution, closes account, terminates service, etc.) in next N days; and<br>$X_i$ is a vector of variables for each customer. As an example, for a deposit account, the vector of variables may include the number of direct deposits, average account balance, etc. As another example, for a demand deposit account, the vector of variables may include Deposit Account Balance, Tenure of Customer, Monthly Credit Amount, Monthly Debit Amount, Balance Change over X months, Balance Change over Y months, Transaction Count Change over X months, Transaction Count Change over Y months, Number of Loans Account, Number of Time Deposit Account, Number of Money Market Account, ACH Debit Transaction Amount, ACH Deposit Transaction Amount, ATM Debit Amount Change over X months, and/or Customer Age. It will be appreciated that these and other variables may be selected based upon an expected contribution to the predictive nature of the Attrition Risk. According to an example embodiment, the weighting factors $\beta_0$, $\beta_k$ utilized for $z_i$ may be determined using statistical analysis (e.g., one or more regressions) on a set of historical data involving the vector of variables $X_i$. In this regard, an actual historical probability $z_i$ (the attrition risk) is known for a customer based upon the historical data. In this way, the weighting factors $\beta_0$, $\beta_k$ can be determined using statistical analysis in order to fit the variables $X_i$ to a known probability, according to an example embodiment of the invention. |
| Share of Wallet | Share of Wallet = (Customer bill payment or transfer amounts from customer's own financial institution) / (Total customer bill payment or transfer amounts to all financial institutions). |
| Value at Risk | Value at Risk = (Future Value of Customer) * Attrition Risk |

At block 220, the optimization computer 160 executing the optimization processing module 180 may identify optimization objectives, constraints, and/or options or preferences. One or more of the optimization objectives, constraints, and/ or options or preferences may be provided by a user of the service provider system 105, the financial institution system 106, or a combination thereof. For example, the financial institution system 106 may provide certain optimization objectives, constraints, and/or options or preferences via network 145 to the optimization computer 160 such that the optimization computer 160 can generate the desired results of the optimizations. Alternatively, a local user of the optimization computer 160 can likewise enter, perhaps via I/O interface 166, certain optimization objectives, constraints, and/or options or preferences such that the optimization computer 160 can generate the desired results of the optimizations.

Examples of optimization objectives, constraints, and preferences or options are provided below for illustrative purposes only:

Example Optimization Objectives

Determine which product or service to offer a particular customer.

Determine which customers should be offered a particular product.

Determine what action(s) (e.g., promotions, offerings of products/services, fee structures, configurations of products/service) should be taken to improve a relationship between a customer and a financial institution. In an example embodiment, the improvement in relationship may be based at least in part on one or more of: (i) reducing attrition risk with the financial institution, (ii) increasing balances or fees from existing products or services, or (iii) generating additional relationships through additional products or services.

Determine what actions(s) (e.g., promotions, offerings of products/services, fee structures, configurations of products/services) should be taken to improve revenue and/or cost for a particular customer of a financial institution.

Migrate customers from a high-cost servicing model to a lower-cost alternative without increasing the risk of attrition or risk of default.

Reduce risk of attrition among customers in a particular segment or micro-segment.

Example Constraints

Limited availability of product or service offerings to A, B, . . . N products or services.

Cost of acquisition limited to a maximum of $X.

Target revenue/cost improvement of a minimum of $X or Y %.

Target only customers in Segment J.

Limit targeted customers to K number of customers.

Channel for target recommendation limited to Channel W (e.g., email, text message, online computer webpage presentation (e.g., as part of financial institution banking website, bill payment website, etc.), telephone, or paper mailing, ATM presentation, in-person teller offering, etc.).

Limit default/delinquency exposure.

Example Preferences or Options

Run optimization [now, scheduled on a particular date, or periodically].

Provide results of optimizations (e.g., identifying customers and recommended actions) in a particular output format. It will be appreciated that many variations of output formats are available, including XML file formats, PDF file formats, database formats, or comma-separated variable (CSV) formats. It will be appreciated that the output format may be based at least in part on whether the results of the optimization may be utilized with, accessed by, or imported into the financial institution software. For example, tellers, customer service representatives, or other agents/employees of the financial institution may have ready access to the results of the optimizations through the financial institution software.

Access results of the optimization via specified portal (e.g., secure-Internet portal access, dedicated program interface, financial institution software, etc.).

Provide constraints to the optimization via specified portal (e.g., secure-Internet portal access, dedicated program interface, financial institution software, etc.).

Following block 220, is a loop among blocks 222, 225, and 227. At block 222, the optimization computer 160 executes the optimization processing module 180 to facilitate the selection of a customer for optimization from one or more available customers. The customer may be selected from the customers for which predictive modeling scores and/or computational values are available from block 215. In addition, the available customers may be limited by any constraints provided by block 220 (e.g., only target customers in a particular segment).

At block 225, one or more optimization processes may be performed by the optimization computer 160 executing the optimization processing module 180. The one or more performed optimizations may be based upon the one or more optimization objectives identified from block 220. As a result of performing one or more optimization processes, one or more recommended actions may be available for the customer. As will be described herein, the one or more recommended actions can include an offering for a product or service to the customer or a configuration of a product or service, according to an example embodiment of the invention. The recommended action can also identify one or more channels for contacting the customer. However, it will be appreciated that in some instances, there may be no recommended actions for the customer. The one or more recommended actions, including a recommendation of no action, may be stored in database 170 and/or data files 172 in association with an identification of the customer.

Following block 225 is block 227, where a determination is made regarding whether any additional customers should be subject to the one or more optimization processes of block 225. If so, then processing may return to block 222, where another customer is selected for optimization. On the other hand, if no customers remain, then processing may proceed to block 230.

It will be appreciated that many variations of the loop among blocks 222, 225, and 227 are available without departing from example embodiments of the invention. According to one variation, an optimization process may determine which customers should be offered a particular product or service. In this scenario, the optimization process may sort through all available customers to determine or identify which customers meet the criteria for being offered a particular product or service.

Once no additional customers remain at block 227, processing may proceed to block 230. At block 230, the one or more respective recommended actions for one or more customers may be provided or output, perhaps in accordance with previously received output format preferences. In an example embodiment of the invention, the one or more recommended actions for one or more customers may be delivered to financial institution system 106, including one or more financial institution computers 140, according to an example embodiment of the invention. One or more employees or computers 140 of the financial institution system 106 can then carry out the one or more recommended actions, as desired or appropriate. It will be appreciated that the one or more recommended actions may be provided to the customers according to channel preferences inferred from prior customer data. For example, prior customer transaction data may be analyzed to determine which channel the customer utilizes most frequently. Example channels, as described herein, can be associated with paper mailing, email, online, telephone, ATM, or in-person communications, or yet other communications, according to an example embodiment of the invention. The most frequently used channel can then be used, for example, when offering the customer a product/service in accordance with a recommended action.

Figure 3:
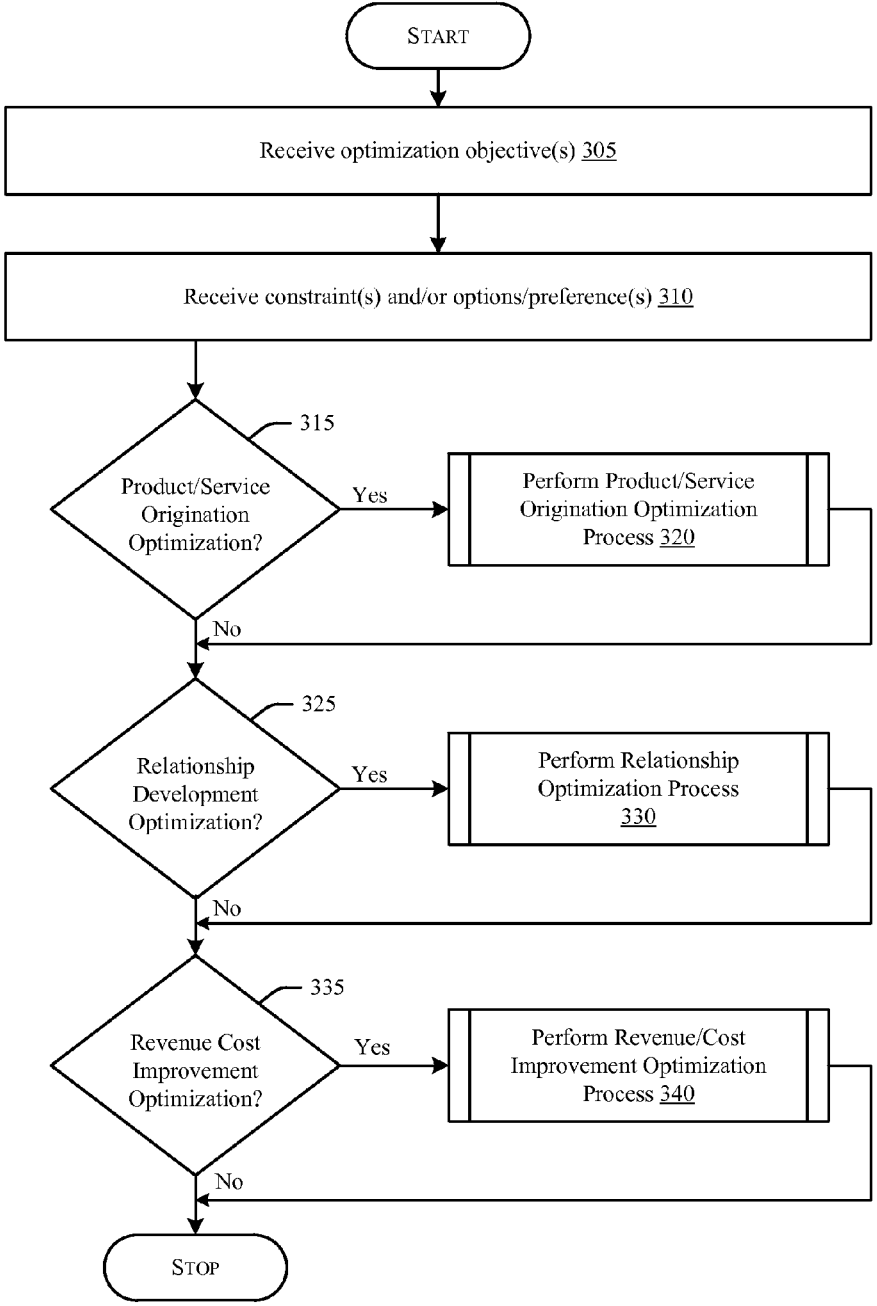
FIG. 3 illustrates an example implementation of a high-level optimization process, according to an example embodiment of the invention.

FIG. 3 illustrates an example implementation of the optimization process for block 225. It will be appreciated that many variations of FIG. 3 are available in accordance with example embodiments of the invention. Turning now to block 305, the optimization objectives, as previously identified by block 220, may be received or retrieved. Similarly, at block 310, the constraints and preferences/options, as likewise previously identified by block 220, may be received or retrieved. It will be appreciated that blocks 305 and 310 may be performed in parallel, or may otherwise be performed by a single block, according to an example embodiment of the invention.

Following block 310 are decision blocks 315, 325, and 335. Decision blocks 315, 325, and 335 may be satisfied, for example, depending on the optimization objectives received in block 305. For example, the decision block 315 relating to product/service origination optimization may be satisfied where a received optimization objective of block 305 is to determine which product or service to offer a particular customer, or to determine which customers should be offered a particular product or service. If decision block 315 is satisfied, then the product/service origination optimization process at block 320 may be performed, perhaps in accordance with any constraints or options/preferences received at block 310.

Likewise, the decision block 325 relating to relationship optimization may be satisfied where an optimization objective of block 305 is to determine what action(s) (e.g., promotions, offerings of products/services, fee structures, configurations of products/service) should be taken to improve a relationship between a customer and a financial institution. If decision block 325 is satisfied, then the relationship optimization process at block 330 may be performed, perhaps in accordance with any constraints or options/preferences received at block 310.

In addition, the decision block 335 relating to revenue/cost improvement optimization may be satisfied where an optimization objective of block 305 is to determine what actions(s) (e.g., promotions, offerings of products/services, fee structures, configurations of products/services) should be taken to improve revenue/cost for a particular customer of a financial institution. If decision block 335 is satisfied, then the revenue/cost improvement optimization process at block 340 may be performed, perhaps in accordance with any constraints or options/preferences received at block 310.

It will be appreciated that more than one optimization process 320, 330, 340 may be performed for one or more customers, according to an example embodiment of the invention. It will further be appreciated that other optimization processes are available beyond those illustrated for blocks 320, 330, and 340, according to an example embodiment of the invention.

Figure 4A:
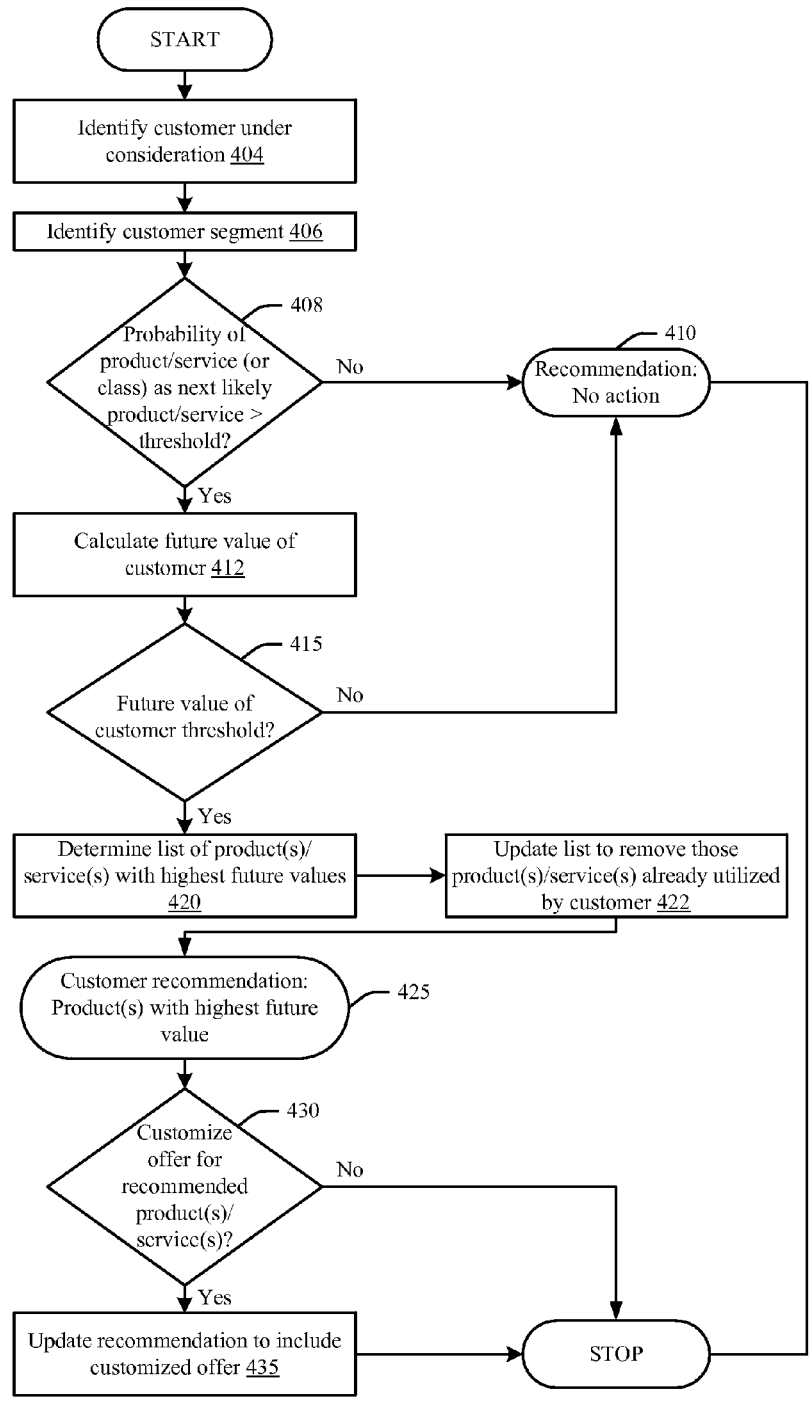
FIG. 4A illustrates an example implementation of a process for product/service origination optimization, according to an example embodiment of the invention.

FIG. 4A illustrates an example implementation for block 320 that is directed towards product/service origination optimization, according to an example embodiment of the invention. It will be appreciated that FIG. 4A may be utilized where an optimization objective is to determine which product or service to offer to one or more customers. Turning now to FIG. 4A, at block 404, the customer under consideration can be identified. In conjunction with identifying the customer, block 404 may further identify or retrieve one or more previously calculated modeling scores and/or computational values from block 215. In addition, any other input data, for example transaction and/or non-transaction data of the customer, that may be needed for performing the product/service origination optimization may also be identified or retrieved at block 404.

Following block 404 is block 406. At block 406, the segment associated with the customer may likewise be identified. It will be appreciated that the segment may have been previously determined for the customer at block 210. Following block 406 is block 408. At block 408, the "probability/propensity to buy" values of the customer for a set of products/services under consideration may be analyzed. As an example, the "probability/propensity to buy" values may be available for a set of products/services, which may include a checking account, a savings account, a money market account, an auto loan, a time deposit account (e.g., certificate of deposit (CD) account), auto loan, mortgage, credit card, debit card, online banking service, and/or electronic bill payment service. It will be appreciated that many alternatives to the set of products/services under consideration may be available in accordance with example embodiments of the invention. An example aspect of block 408 may be to determine whether a customer has a sufficiently high probability/propensity to buy at least one product or service (or any product within a class of products (e.g., loan products)) such that the customer should be considered for an offer for a product/service. Thus, it will be appreciated that the one or more threshold values of block 408 may be set based upon one or more constraints identified by block 310 (or similarly, block 220).

If all of the "probability/propensity to buy" values are below the threshold value(s), then processing may proceed to block 410. At block 410, the recommended action for the customer may be determined to be "No Action". On the other hand, if one or more of the "probability/propensity to buy" values do indeed meet or exceed certain threshold value(s), then processing may proceed to block 412.

At block 412, the future value of the customer may be calculated in accordance with the set of products or services under consideration. It will be appreciated that in some example embodiments, the future value of the customer may have been previously determined at block 215. However, in other example embodiments where the future value of the customer is not already available, or where the future value of the customer was not calculated with respect to the same set of products or services presently under consideration, then a process such as that shown in FIG. 5 can be utilized to calculate the future value of the customer.

Figure 5:
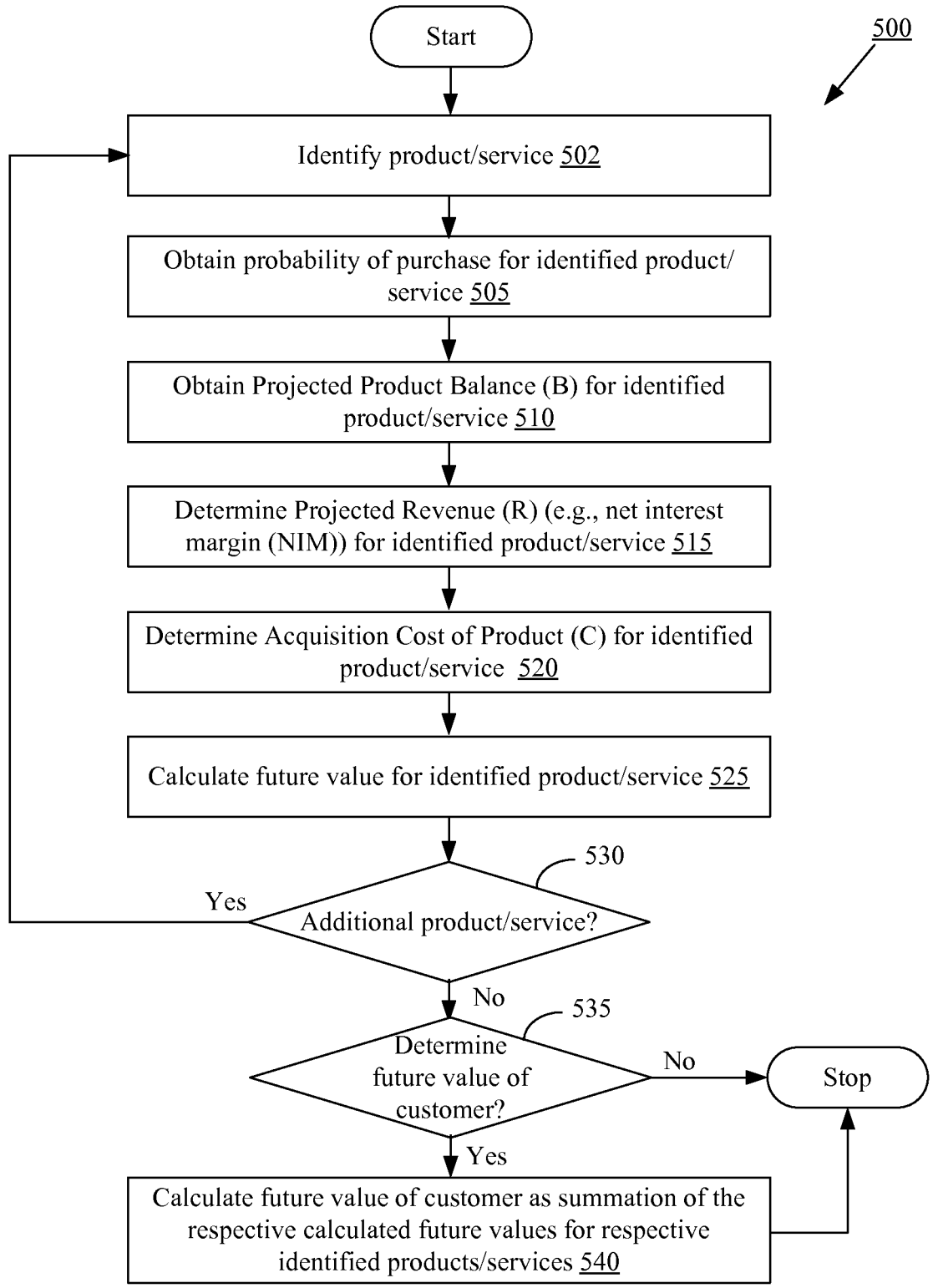
FIG. 5 illustrates an example implementation of a process for calculating a future value, according to an example embodiment of the invention.

In particular, FIG. 5 illustrates an example implementation for a process 500 for calculating the future value of the customer. Turning now to FIG. 5, at block 502, a product/service is identified from the set of products or services under consideration. In an example embodiment of the invention, the set of products or services under consideration may be those products or services not currently held or utilized by the customer. However, in an alternative embodiment of the invention, the set of products or services under consideration could include products/services already held or utilized by the customer. In this case, the associated "probability/propensity to buy value" for a product/service already held or utilized by the customer may be zero or low value since in some embodiments, a customer is unlikely to be able to utilize multiple instances of a same product/service.

Following block 502 is block 505, where the "probability/propensity to buy value" for the identified product/service is obtained or calculated, as discussed herein. The "probability/propensity" to buy value may indicate the likelihood (e.g., a percentage) that the customer will buy/utilize a product or enroll/utilize in a service in a certain period of time.

At block 510, the projected product/service balance (B) for the identified product/service is also obtained. The projected product/service balance may indicate an expected balance if a customer were to buy/utilize a product or enroll/utilize in a service in a certain period of time. In an example embodiment of the invention, the projected product/service balance may have been obtained based upon a prior analysis of historical balances of customers in a customer segment. In this regard, the financial institution can determine the projected product/service balance by analyzing customer balances for current customers within a particular segment (e.g., determining an "average" balance by customer segment). In an alternative embodiment, the financial institution can also determine the projected product/service balance by analyzing customer balances for current customers irrespective of segment (e.g., by random sampling, for all customers, etc). Yet further, in another alternative embodiment, the projected product/service balance may not be based upon a financial institution's data for its customers, but rather may be an industry benchmark product/service balance that is obtained from an external entity and stored for subsequent access in database 170 or data files 172. An industry benchmark product/service balance may be determined by an external entity analyzing data from a variety of financial institutions, according to an example embodiment of the invention. It will appreciated that a combination (e.g., multiplication) of the "probability/propensity to buy value" and the "projected product/service balance" may provide an adjusted product/service balance that accounts for the likelihood for purchase or enrollment, according to an example embodiment of the invention.

Following block 510 is block 515, where the projected revenue assumption (R) may be determined for the identified product or service. In an example embodiment, the projected revenue assumption, which may be expressed as a net interest margin value, may be the same for any products/services for a customer in a particular segment. However, in other example embodiments, the projected revenue assumption may be based upon both a segment and a particular product/service, or on a particular product but not a segment. The projected revenue assumption, when applied to or combined with (e.g. multiplied by) the projected product/service balance (or adjusted product/service balance), may generate a measure of how much revenue is expected from the particular product or service. The projected revenue assumption may be an industry benchmark value that is obtained from an external entity and stored for subsequent access in database 170 or data files 172. Alternatively, the projected revenue assumption can also be determined by a financial institution based upon analyzing historical revenue and/or profitability measures of its existing customers.

Following block 515 is block 520, where the acquisition cost (C) is determined. The acquisition cost generally refers to an amount that a financial institution will need to spend in order to successfully enroll, register, or sign up a customer for a product/service. In an example embodiment, the acquisition cost may be the same for any products/services for a customer in a particular segment. However, in other example embodiments, the projected acquisition cost may be based upon both a segment and a particular product/service. In addition or in the alternative, the acquisition cost may also be further based upon the expected channel by which the product/service (e.g., email, paper mail, telephone, teller) will be offered to the customer. In this regard, the financial institution can determine the projected acquisition cost by analyzing prior data for acquisition costs for current customers within a particular segment (e.g., determining an "average" acquisition cost by customer segment). In an alternative embodiment, the financial institution can also determine the acquisition cost by analyzing acquisition costs for current customers irrespective of segment (e.g., by random sampling, for all customers, etc). Yet further, in another alternative embodiment, the acquisition cost may not be based upon a financial institution's data for its customers, but rather may be an industry benchmark value that is obtained from an external entity and stored for subsequent access in database 170 or data files 172. An industry benchmark product/service balance may be determined by an external entity analyzing data from a variety of financial institutions, according to an example embodiment of the invention.

At block 525, the future value may be calculated for a particular product or service for the customer at hand. In an example embodiment of the invention, the future value may be calculated as follows: Future Value=(Probability/Propensity to Buy Value)*(Projected Product/Service Balance)*(Projected Revenue assumption)*(1−Attrition Risk)−Acquisition Cost, where the Attrition Risk was previously determined at block 215. It will be appreciated that the foregoing future value calculation is provided by way of example, and that many other variations are available without departing from example embodiments of the invention.

Following block 525 is block 530, which determines whether any additional products/services exist that still need a future value calculation. If so, then the process returns to block 502. Table III below illustrates example future values that are calculated for a set of products/services based upon a respective Probability/Propensity to Buy Value, Projected Product/Service Balance, Projected Revenue assumption, Attrition Risk, and Acquisition Cost. In Table III, the Projected Product/Service Balance and Acquisition Cost differs based upon product/service, but the Projected Revenue assumption may remain the same for a particular customer segment. However, it will be appreciated that in other example embodiments, the Projected Revenue assumption could vary depending upon the product or service as well. Likewise, the Attrition Risk may have been determined independently of the customer segment, and may be the same for all products and services; however, the Attrition Risk can also vary based upon the product or service without departing from example embodiments of the invention.

TABLE III

| Product/Service under Consideration | Probability/Propensity to Buy Value (%) | Projected Product/Service Balance | Projected Revenue assumption (e.g., Net Interest Margin) (percentage) | Attrition Risk (%) | Acquisition Cost | Future Value (of Product/Service) Year 1 |
|---|---|---|---|---|---|---|
| Auto Loan | 60% | $12,000 | 0.025 | 0.02 | $125 | $ 51.40 |
| Home Equity Line of Credit (HELOC) | 50% | $26,000 | 0.025 | 0.02 | $100 | $218.50 |
| Credit Card | 25% | $ 7,500 | 0.025 | .02 | $ 75 | −$ 29.06 |

Having calculated the respective future values for each product/service in the set under consideration, processing may proceed to block 535. At block 535, it may be determined whether the future value of the customer based upon the set of products/services under consideration is needed. If not, then the processing of FIG. 5 may terminate. Otherwise, the processing may proceed to block 540. At block 540, the future value of the customer may be calculated. According to an example embodiment of the invention, the future value of the customer may be calculated as the summation of respective calculated future values of the products/services under consideration. For example, if the set of products consists of the 3 products in Table III (Auto Loan, HELOC, and Credit Card), then the Future Value of the Customer may be $240.84, which is calculated as $51.40 (for Auto Loan)+$218.50 (for HELOC)−$29.06 (for Credit Card), according to an example embodiment of the invention.

Returning now to block 412 of FIG. 4A, the future value of the customer has been determined via the process of FIG. 5, and processing may proceed to block 415. Block 415 may determine whether the future value of the customer exceeds a threshold value. An example aspect of block 415 may be to determine whether a customer has a sufficiently high future value to be considered for one or more product/service offerings. The threshold value for block 415 may be set based upon one or more constraints identified by block 310 (or similarly, block 220).

If the customer future value does not meet the threshold value, then processing may proceed to block 410, where the recommended action for the customer may be determined to be "No Action". On the other hand, if the customer future value meets or exceeds the threshold value, then processing may proceed to block 420. At block 420, a list of product(s)/service(s) with the highest future values may be determined for the customers. In block 420, the future values for the product(s)/service(s), which may have been determined as part of block 412, may be used to identify a specified number of product(s)/service(s) with the highest future values. For example, if there are 7 products/services in the set under consideration, perhaps only a portion of the set (e.g., 3 product/services) having the highest future values may be selected. The desired number of products/services in the list may be set based upon one or more constraints identified by block 310 (or similarly, block 220).

Block 422, which can occur in conjunction with or subsequent to block 420, may remove from the list, those products or services already being utilized by the customer. In this way, the customer is not offered a product or service that he or she may already have. In some example embodiments of the invention, block 420 may be optional. In particular, while the customer may already have a product or service, there may be configuration or customizations that can be provided to the existing product or service of the customer (See, e.g., block 430 described below).

Following block 422 is block 425. At block 425, the customer recommendation may be a product/service offering or recommendation based upon the one or more products/services with the highest future value in the list. For example, the product/service with the highest future value in the list may be the one that will be offered to the customer. It will be appreciated that the number of products/services included with the customer recommendation can be set based upon the options/preferences identified by block 310 (or similarly, block 220). It will also be appreciated that in some instances, block 422 may remove all products/services from the list. In this case, in block 425, the recommended action for the customer may be determined to be "No Action", according to an example embodiment of the invention. The recommended action for a customer may be stored in association with a customer identifier for subsequent access in database 170 and/or data files 172.

Following block 425 is block 430, where a determination is made with respect to whether to customize the customer's offering of the recommended product(s)/service(s).

For example, if a loan product were to be recommended, the offered interest rate may need to be set. As another example, for many financial products to be recommended, there may be one or more fees that may need to be set (e.g., credit card annual fees, closing costs for loan products, deposit account fees, etc.). In addition, the customization of the offering can also include indicating a preferred channel by which to offer the recommended product or service. In some example embodiments, the preferred channel may be set as an option by a financial institution or service provider, perhaps in accordance with block 310 (or block 220). In other example embodiments, the preferred channel may be based at least in part upon an analysis of prior transaction data of the customer. For example, the preferred channel may be based upon the most recent channel indicated by the prior transaction data. Alternatively, the preferred channel may be based upon which channel is indicated by a majority of the prior transaction data of the customer within a time frame. As another alternative, the preferred channel may be based upon whether a channel is specified by the institution or service provider, and further indicated by at least one or more prior transactions of the customer. It will be appreciated that at block 435, any customization of the customer's offering of the recommended product(s)/service(s) may be stored in association with a customer identifier for subsequent access in database 170 and/or data files 172.

Figure 4B:
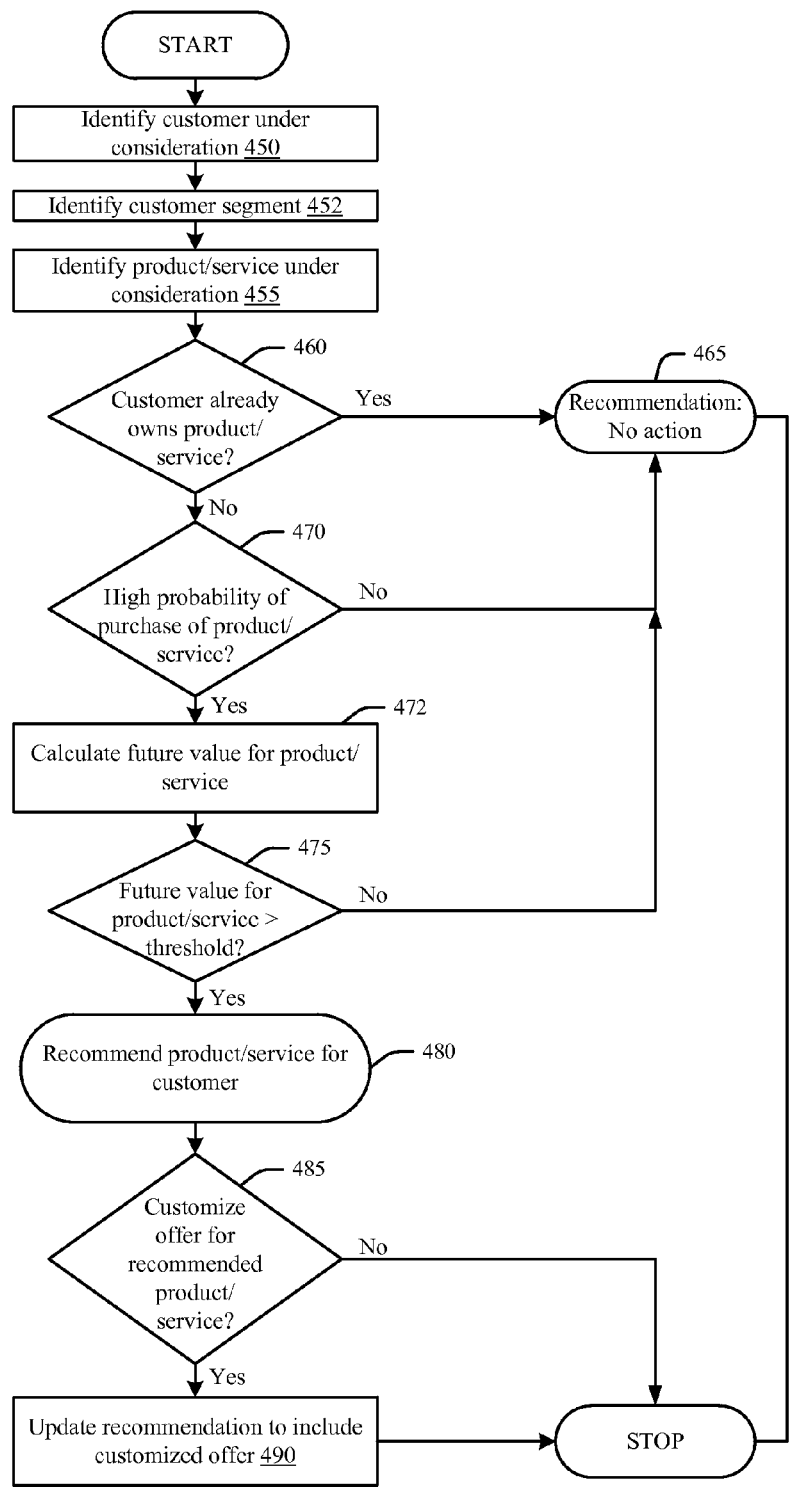
FIG. 4B illustrates an alternative implementation of a process for product/service origination optimization, according to an example embodiment of the invention.

FIG. 4B illustrates an alternative implementation for block 320 that is directed towards product/service origination optimization. It will be appreciated that FIG. 4B may be utilized where an optimization objective is to determine which customers should be offered a particular product or service. Turning now to FIG. 4B, at block 450, the customer under consideration can be identified. In conjunction with identifying the customer, block 450 may further identify or retrieve one or more previously calculated modeling scores and/or computational values determined in block 215. In addition, any other input data, for example transaction and/or non-transactional data of the customer, that may be needed for performing the product/service origination optimization may also be identified or retrieved at block 450.

Following block 450 is block 452. At block 452, the segment associated with the customer may likewise be identified. It will be appreciated that the segment may have been previously determined for the customer at block 210. Following block 452 is block 455. At block 455, a particular product/service under consideration for an offering may be identified. It will be appreciated that one or more particular products/services may have been identified as a constraint at block 310 (or similarly, block 220).

Following block 455 is block 460. Block 460 may determine whether the customer already owns or utilizes the particular product or service identified from block 455. An example aspect of block 460 may be to reduce an irrelevant or duplicative offering by eliminating from consideration, those customers that already have the particular product or service under consideration for an offering. Accordingly, if block 460 determines that the customer already owns or utilizes the particular product or service, then processing may proceed to block 465, where the recommended action for the customer may be determined to be "No Action".

On the other hand, block 460 may determine that the customer does not already own or utilize the particular product or service, and processing may proceed to block 470. Block 470 may obtain the "probability/propensity to buy" value associated with the particular product/service for the customer. The "probability/propensity to buy" value may have been previously calculated as part of block 215. Block 470 may also obtain the one or more threshold values by which the "probability/propensity to buy" value may be compared to. The one or more threshold values may be static in one embodiment. However, in another embodiment, the one or more threshold values may be dynamic, for example, when obtained or set by one or more constraints or preferences at block 310 (or similarly, block 220). An example aspect of block 470 may be to determine whether a customer has a sufficiently high probability/propensity to buy for the particular product or service (compared to the one or more threshold values) such that the customer should be considered for an offer for the particular product/service.

If at block 470, the "probability/propensity to buy" value for the particular product/service does not meet a certain threshold value such that a determination is made that there is not a high probability/propensity to buy, then processing may proceed to block 465 where the recommended action for the customer may be determined to be "No Action".

On the other hand, at block 470, the "probability/propensity to buy" value for the particular product/service may meet or exceed a certain threshold value such that a determination is made that there is a high enough probability/propensity to buy value, and processing may proceed to block 472. At block 472, the future value for the particular product/service may be determined. It will be appreciated that the future value for the particular product/service may have been previously determined at block 215, and if so, the future value may be obtained from database 170 and/or data file 172. On the other hand, if the future value is not available, then it may be calculated in accordance with FIG. 5, discussed herein, according to an example embodiment of the invention.

Following block 472 is block 475, where a determination is made as to whether the future value for the particular product or service exceeds one or more thresholds. The one or more threshold values may be static in one embodiment. However, in another embodiment, the one or more threshold values may be dynamic, for example, when obtained or set by one or more constraints or preferences at block 310 (or similarly, block 220). An aspect of block 475 may be to determine whether the future value of the particular product or service is sufficiently high in order to proceed with an offering of the particular product or service of the customer. Accordingly, if at block 475, the future value for the particular product or service does not exceed the threshold, then processing may proceed to block 465, where the recommended action for the customer may be determined to be "No Action".

On the other hand, block 475 may determine that the future value for the particular product or service does meet or exceed the threshold, in which case processing may proceed to block 480. At block 480, the particular product or service under consideration may be approved for recommendation to the customer. The recommended product or service for the customer may be stored in association with a customer identifier for subsequent access in database 170 and/or data files 172.

Following block 480 is block 485. At block 485, a determination is made with respect to whether to customize the customer's offering of the recommended product or service, as similarly discussed above with respect to block 430. If there is any customization of the customer's offering of the recommended product or service, then those customizations may be stored in association with a customer identifier for subsequent access in database 170 and/or data files 172 at block 490.

Figure 6:
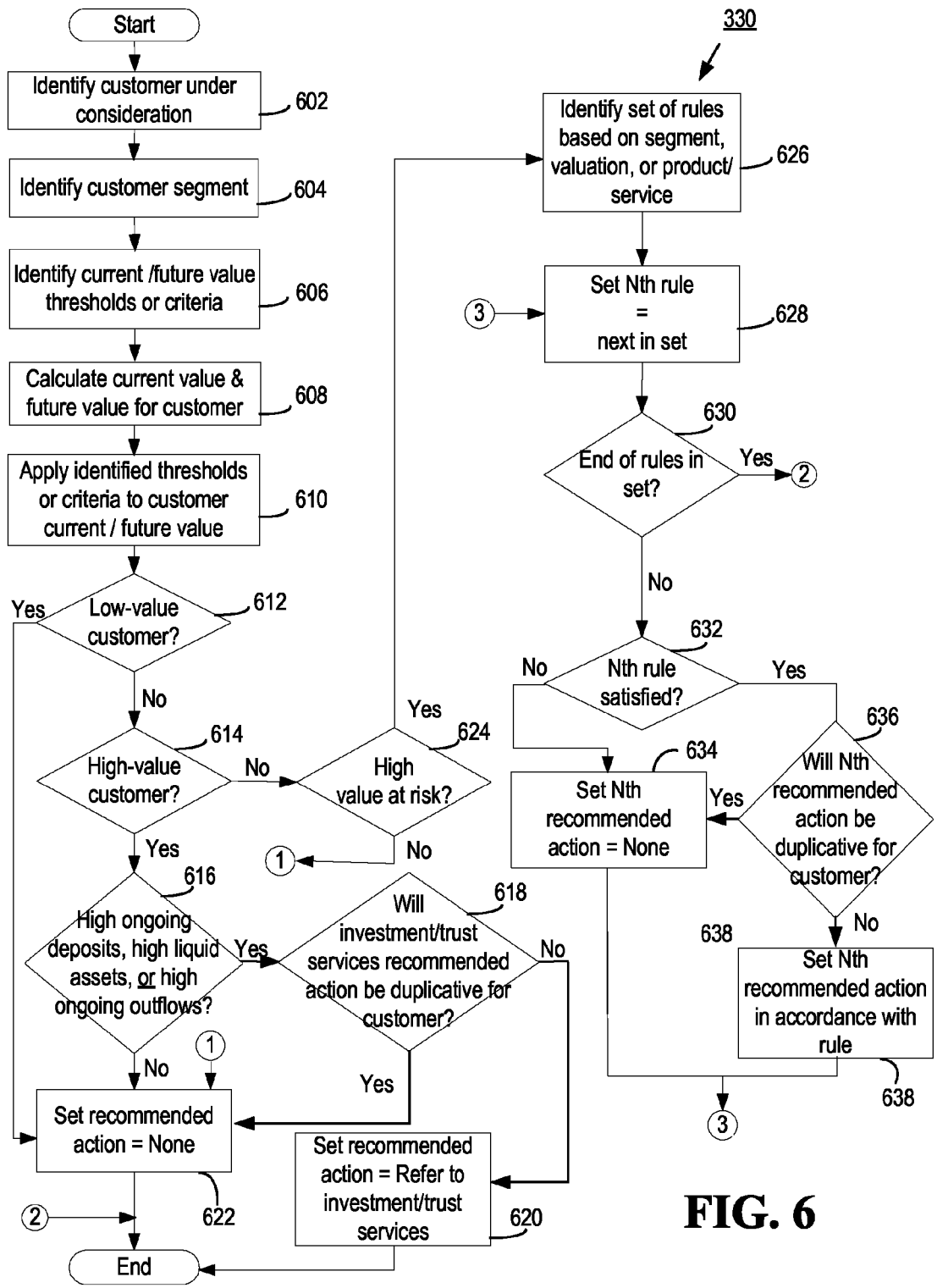
FIG. 6 illustrates an example implementation of a process for relationship optimization, according to an example embodiment of the invention.

FIG. 6 illustrates an example implementation of block 330 that is directed towards relationship optimization, according to an example embodiment of the invention. It will be appreciated that FIG. 6 may be utilized where an optimization objective is to determine what action(s) (e.g., promotions, offerings of products/services, fee structures, configurations of products/services) should be taken to improve a relationship between a customer and a financial institution, or to make a particular benefit (e.g., free month of service for example) available to certain customers only. Benefits can be either of a "hard" nature (e.g., an offered product or service), or of a "soft" nature (preferred status in branches, guaranteed routing to a live-CSR in a call center rather than a voice-response-unit (VRU), free investment newsletter, etc). Turning now to FIG. 6, at block 602, the customer under consideration can be identified. In conjunction with identifying the customer, block 602 may further identify or retrieve one or more previously calculated modeling scores and/or computational values determined at block 215. In addition, any other input data, for example transaction and/or non-transactional data of the customer, that may be needed for performing the relationship optimization may also be identified or retrieved at block 602.

At block 604, the segment associated with the customer may likewise be identified. It will be appreciated that the segment may have been previously determined for the customer at block 210. Following block 604 is block 606. At block 606, one or more thresholds relating to a current value and/or future value of the customer may be identified. These one or more thresholds may have been set based upon one or more constraints identified by block 310 (or similarly, block 220). The one or more thresholds may be subsequently utilized in block 610 to determine an extent to which relationship improvement actions may be provided based upon the current value and/or future value of a customer.

Following block 606 is block 608, where the current value and the future value of the customer may be calculated. It will be appreciated that in some example embodiments, the current value and the future value of the customer may have been previously determined at block 215. However, in some example embodiments, the current value and/or future value of the customer may not already be available, or the current value and/or future value may not have been calculated with respect to a same set of products or services. As such, if the current value is not currently available, then a process such as that shown in FIG. 7 may be utilized to calculate the current value.

Figure 7:
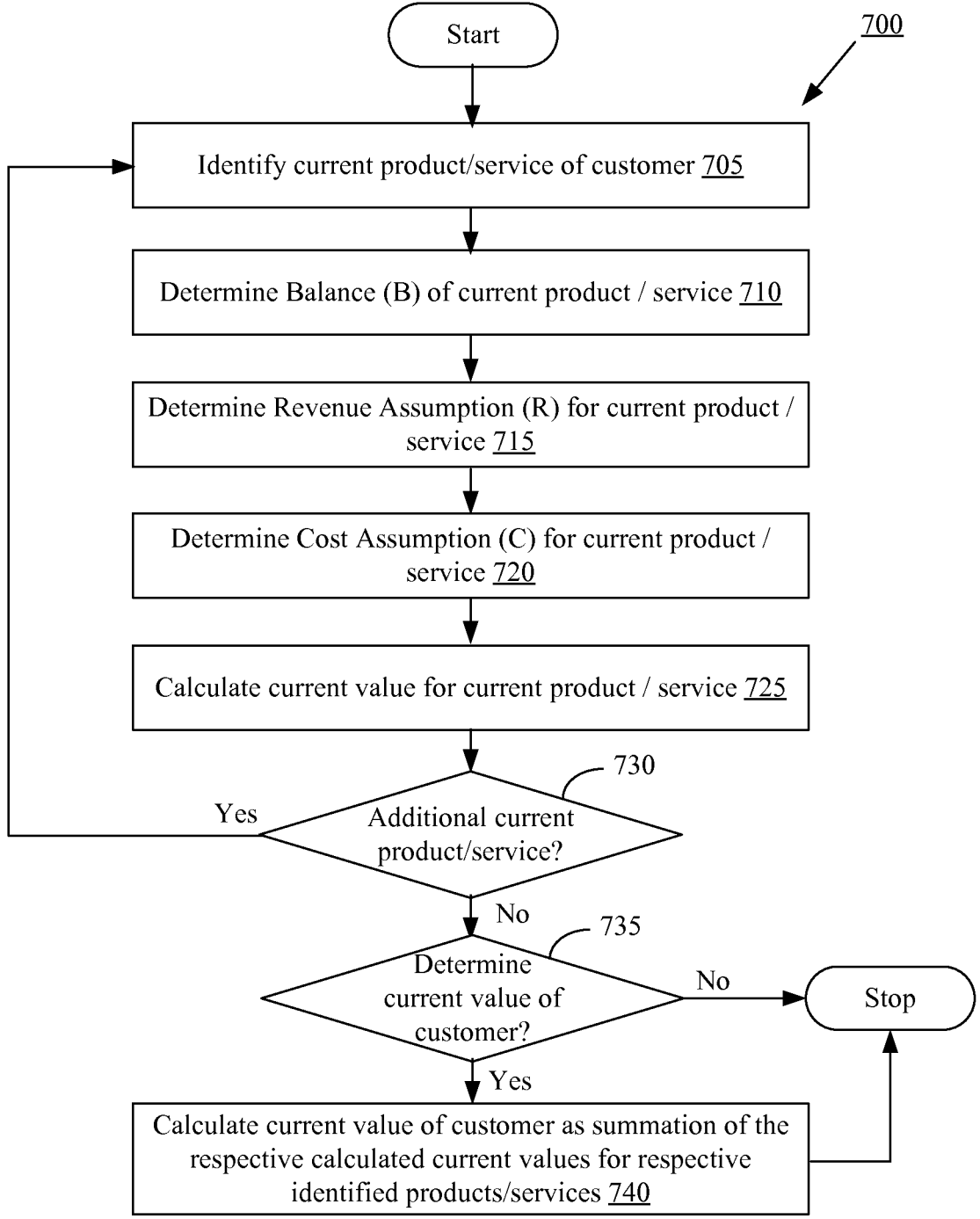
FIG. 7 illustrates an example implementation of a process for calculating a current value, according to an example embodiment of the invention.

Turning now to the process 700 of FIG. 7, at block 705, a current or existing product or service is identified. The current or existing product or service may be limited to those of the customer with a particular financial institution, perhaps one that is seeking to improve its relationship with the customer, according to an example embodiment of the invention. However, alternative embodiments, the current or existing product or service may be scoped to two or more financial institutions without departing from example embodiments of the invention. Following block 705 is block 710, where the current balance of the identified product or service is identified, perhaps by retrieving such balance information from database 170 and/or data files 172. Following block 710 is block 715, where a revenue assumption (R) may be identified for the identified product or service. The revenue assumption, when applied to the projected product/service balance, may generate a measure of how much revenue may be generated from the particular/product service. In an example embodiment of the invention, the determined revenue assumption may be an industry benchmark value that is obtained from an external entity and stored for subsequent access in database 170 or data files 172. The revenue assumption may be the same for the particular product/service irrespective of the customer segment, or it may differ from one customer segment to another. For example, the revenue assumption may be a first value for a particular product/service held by a first customer in a first segment, but may be a second value for the particular product/service held by a second customer in a second segment different from the first segment.

Following block 715 is block 720. At block 720, the cost assumption (C) associated with the particular product/service with the customer is identified. The cost assumption may generally refer to an amount that the financial institution spends to service or maintain the product/service with the customer. The amount can be a fixed amount, or it may be represented as a percentage or proportion of another value such as a balance or transaction volume. In an example embodiment, the cost assumption can be the same for the particular product/service irrespective of the customer segment, or it may differ from one customer segment to another. The cost assumption may be an industry benchmark value that is obtained from an external entity and stored for subsequent access in database 170 or data files 172.

At block 725, the current value may be calculated for a particular product or service. In an example embodiment of the invention, the future value may be calculated as follows: Current Value=(Balance*Revenue assumption)−Cost Assumption. The current value may be stored in association with an identification of the customer and a product/service in database 170 and/or data files 172, according to an example embodiment of the invention.

Following block 725 is block 730, which determines whether any additional products/services of the customer still need a current value calculation. If so, then the process returns to block 705. Table IV below illustrates example current values that are calculated for existing product/services of a customer.

TABLE IV

| Existing Product/Service | Balance | Revenue Assumption | Cost Assmption | Current Value Annualized (of Product/Service) |
|---|---|---|---|---|
| Checking Account | $5,375 | 0.020 | $25 | $ 82.50 |
| Credit Card | $9,854 | 0.043 | $50 | $373.72 |
| Money Market | $1,200 | 0.023 | $20 | $ 35.20 |

Having calculated the respective current values for each product or service of the customer, processing may proceed to block 735. At block 735, it may be determined whether the current value of the customer is needed. If not, then the processing of FIG. 7 may terminate. Otherwise, the processing may proceed to block 740. At block 740, the current value of the customer may be calculated. According to an example embodiment of the invention, the current value of the customer may be calculated as the summation of the respective calculated current values of the current products or services of the customer. For example, if the customer has the 3 products in Table IV (Checking Account, Credit Card, and Money Market), the Current Value of the Customer may be $491.42, which is calculated as $82.50 (for Checking Account)+$373.72 (for Credit Card)+$35.20 (for Money Market), according to an example embodiment of the invention. It will be appreciated that the current value of the customer may be stored in association with an identification of the customer in database 170 and/or data files 172, according to an example embodiment of the invention. It will be appreciated that many variations of FIG. 7 are available in accordance with example embodiments of the invention.

Returning now to block 608 of FIG. 6, the current value of the customer may have been determined or otherwise calculated as discussed above. Likewise, the future value of the customer may be determined, perhaps in accordance with FIG. 5, discussed herein. It will be appreciated that in some example embodiments, the set of products/services utilized in computing the future value of the customer may exclude those products/services already held or utilized by the customer with the financial institution. Indeed, the set of products/services utilized in computing the future value of the customer may include additional products/services not currently held or utilized by the customer with the financial institution. However, even if the existing products/services are included within the set of products/services, other factors such as the "propensity to buy product/service" may be significantly lower (or zero) for those existing products/services such that the inclusion of existing products/services will not have a material effect on the calculated future value of the customer.

Following block 608, processing may proceed to block 610. At block 610, the one or more identified thresholds or criteria of block 606 may be applied to the calculated current value/future value of the customer to determine an overall value of the customer. The overall value of the customer can determine which actions are available for the customer. It will be appreciated that there are may be various methods of applying one or more thresholds to the current value/future value of the customer to determine the overall value of the customer. In one example embodiment of the invention, the current value and the future value can be mathematically combined to generate an estimated total value. For example, the current value and the future value, which may be respectively weighted with weighting factors if necessary, may be summed together to provide an overall or total customer value. The total customer value may then be subject to thresholds to determine whether the customer's total value indicates one of the following 3 example gradations: low value (e.g., total customer value<Threshold1), medium value (e.g., total customer value (e.g., Threshold1≥total customer value>Threshold2), or high value (e.g., total customer value≥Threshold2). It will be appreciated that fewer or additional thresholds may be utilized to provide fewer or additional gradations without departing from example embodiments of the invention (e.g., 1 threshold=2 gradations; 3 thresholds=4 gradations, etc.).

According to an alternative example embodiment of the invention, the total customer value can likewise be classified or separated into example gradations using an alternate example process. For example, one or more thresholds can be applied to the calculated current customer value to determine which of the following 3 example discrete levels the current customer value may be classified under: (i) a high current customer value, (ii) a medium current customer value, or (iii) a low current customer value. Similarly, one or more thresholds can be applied to the calculated future customer value to determine which of the following 3 example discrete levels the current customer value may be classified under: (i) a high future customer value, (ii) a medium future customer value, or (iii) a low future customer value. In this example, there are 3 possible discrete levels for classifying the current customer value and the future value, thereby providing for 9 possible combinations of discrete levels for the current value and the future value. Each of these 9 possible combinations can be a respective gradation, according to an example embodiment of the invention. Alternatively, the 9 possible combinations can be separated into the desired number of gradations. For example, a low-value customer gradation can encompass a combination of a low current value and a low future value. A high-value customer gradation can encompass a combination of a high current value and a high future value. A medium-value customer gradation can encompass the remaining 7 possible combinations, according to an example embodiment of the invention.

Following block 610 may be some variation of blocks 612 and 614. In particular, blocks 612 and 614 may define an extent to which a particular customer is provided with a recommended action based upon the particular gradations determined at block 610 for the customer. For example, block 612 may determine that the customer is a low-value customer, in which case processing may proceed to block 622, where the recommended action may be set to "None" to indicate that no action is recommended. On the other hand, block 612 may determine that the customer is not a low-value customer, in which case processing may proceed to block 614.

Block 614 may determine that the customer is a high-value customer in which case processing may proceed to block 616. Block 616 may determine whether the high-value customer has certain attributes desired for eligibility for one or more recommended actions. For example, block 616 may determine whether the customer has one or more of high ongoing deposits, high liquid assets, or high ongoing outflows. The ongoing deposit, liquid asset, or outflow level may be determined by analyzing that data from one or more databases 110*a-n*, perhaps data from at least account processing database 110*c*, according to an example embodiment of the invention. If the customer does have the required attributes of block 616, then processing may proceed to block 618. Block 618 may determine whether the customer already has the investment/trust services that are to be recommended, and if so, processing may proceed to block 622, where the recommended action may be set to "None". On the other hand, if block 618 determines that the customer does not already have the investment/trust services, then processing may proceed to block 620, where the recommended action is set to "Refer to investment/trust services." Example investment/trust services may involve referring the customer to an investment advisor to assist in setting up one or more brokerage accounts, mutual funds, annuities, trusts, insurance products (e.g., variable or whole life insurance products with investment components), estate planning, and the like.

It will be appreciated that the investment/trust services of blocks 618 and 620 are provided by way of example only, and that other products/services may be provided as recommended actions for high-value customers, according to an example embodiment of the invention.

On the other hand, block 614 may determine that the customer is not a high-value customer, which in combination with block 612, implies that the customer is a medium-value customer. In this case, processing may proceed to block 624. Block 624 may determine whether there is a high value at risk at stake. In particular, block 624 may obtain the value at risk score calculated at block 215 for comparison to a threshold value. The threshold value may be static in one embodiment. However, in another embodiment, the threshold value may be dynamic, for example, when obtained or set by one or more constraints or preferences at block 310 (or similarly, block 220). If the value at risk score is not higher than the threshold—that is, there is not a high value at risk—then processing may proceed to block 622, where the recommended action may be set to "None." This approach may be used in a situation where it may not be desirable to spend resources on a customer in which there is not a high value at risk.

On the other hand, block 624 may determine that there is indeed a high value at risk (e.g., the value at risk score exceeding the threshold), and processing may proceed to block 626. At block 626, a set of eligibility rules for one or more actions may be obtained based upon at least one of (i) the customer segment, (ii) the current value and/or future value, or (iii) a product or service desired for customization or an offering. In an example embodiment of the invention, there may be a first set of actions available for a particular customer segment, and the eligibility rules associated with that first set of actions may be identified. Similarly, the current value and/or future value, either alone or in some type of combination, may indicate a particular overall customer value that may be associated with a second set of actions, and the eligibility rules associated with that second set of actions may be identified. Finally, a preference or constraint may have been specified regarding the desirability of a product or service for customization or an offering, and the eligibility rules associated with a third set of actions available for the product or service. It will be appreciated that the first, second, and third set of actions may each only include a single action without departing from example embodiment of the invention. In addition, the set of eligibility rules can also be based on a combination of two or more of (i) the customer segment, (ii) the current value and/or future value, (iii) a product or service desired for customization or an offering. It will be appreciated that eligibility rules may be based upon different factors than the three described herein for illustrative purposes.

Accordingly, block 626 may identify a set of eligibility rules for respective actions that may be provided for the customer. Block 628 may initialize by setting the Nth eligibility rule to be a next (e.g., not-yet-processed) rule in the set of eligibility rules. If block 630 determines that the end of the rules in the set have been reached, then processing may stop. Otherwise, processing proceeds from block 630 to block 632. Block 632 may determine whether the customer satisfies the Nth eligibility rule. In general, the Nth eligibility rule will specify the criteria that the customer must satisfy prior to being recommended an action associated with the eligibility rule. As an example, a first example eligibility rule may be for a recommended action of a "Payment Holiday"—that is, the customer may have the option of skipping a next payment on a loan product. The first example eligibility rule for this recommended action may require that the customer have made a predetermined number of consecutive on-time payments since any prior payment holiday received. Likewise, the first example eligibility rule may further specify that only certain types of loan products (e.g., credit card, HELOC, auto loan, etc.) of the customer will be considered for a payment holiday. As another example, a second example eligibility rule may be for a recommended action of a "fee waiver". If the fee waiver is for a customer's credit card, the second example eligibility rule for this recommended action may require that the customer have charged at least a certain amount of purchases on the credit card over a period of time (e.g., for the past 6 months, year, etc.). Likewise, if the fee waiver is for a new product (i.e., a fee waiver for closing costs on a HELOC) to be recommended to the customer, then the eligibility rule for this recommended action may require that the customer be within a particular segment (e.g., relationship agnostic) and/or have at least a threshold amount of liquid assets with the financial institution. It will be appreciated that other additional eligibility rules may be provided, including one or more of the following in Table V.

TABLE V

| Eligibility Rule | Associated Recommended Action |
|---|---|
| Customer currently not enrolled in online banking | Recommend Online Banking |
| Customer not registered for electronic bill payment services | Recommend electronic bill payment services |
| Customer currently receiving paper notifications | Recommend notifications via email |

If the Nth eligibility rule at block 632 is not satisfied, then processing may proceed to block 634, where the Nth recommended action may be set to "None" to indicate that no action is recommended. On the other hand, if the Nth eligibility rule at block 632 is satisfied, then processing may proceed to block 636. Block 636 may determine whether an Nth recommended action may be duplicative. The duplication may be in one of at least two situations. First, the customer may already have a product/service that may be recommended by the Nth recommended action. Second, a prior recommended action may have likewise provided the same action as the Nth recommended action, according to an example embodiment of the invention. If the action would not be duplicative, then processing may proceed to block 638. At block 638, the Nth recommended action may be set in accordance with the Nth eligibility rule. Following block 638 or block 634, processing may return to block 628. Processing may end when block 630 determines that the end of the eligibility rules in the set has been reached. It will be appreciated that the recommended actions for the customer may be stored in association with a customer identifier in database 170 and/or data files 172, according to an example embodiment of the invention.

Following the process of FIG. 6, one or more eligible products/services may be selected for recommendation to the customer. For example, one or more constraints or preferences may have been previously set such that only a maximum number of products/services may be recommended for any particular customer. Accordingly, if the customer is eligible for more than the maximum number of products/services, then a prioritization scheme may be used to determine which products/services are available for recommendation to the customer. For example, the prioritization may be based upon, for example, least costly to most costly cost of acquisition for a product/service, or alternatively or additionally, on most profitable to least profitable product/service. The one or more recommended products/services for the customer may be stored in association with a customer identification in database 170 or data files 172, according to an example embodiment of the invention.

Figure 8:
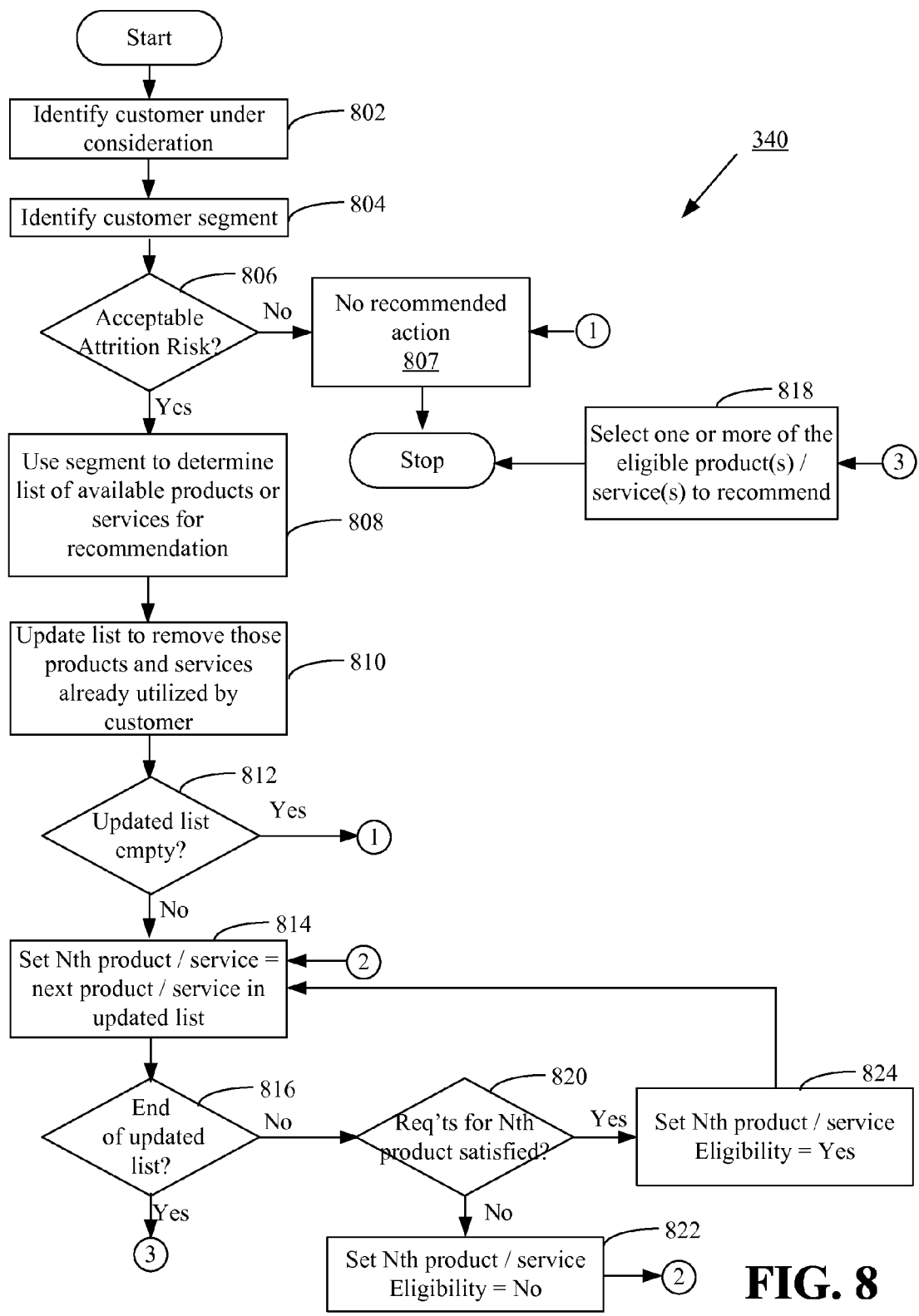
FIG. 8 illustrates an example implementation of a process for revenue and/or cost improvement optimization, according to an example embodiment of the invention.

FIG. 8 illustrates an example implementation of block 340 that is directed towards revenue and/or cost improvement optimization, according to an example embodiment of the invention. It will be appreciated that FIG. 8 may be utilized where an optimization objective is to determine what actions(s) (e.g., promotions, offerings of products/services, fee structures, configurations of products/services), if any, should be taken to improve revenue associated with the customer or otherwise reduce costs associated with a particular customer. Turning now to FIG. 8, at block 802, the customer under consideration can be identified. In conjunction with identifying the customer, block 802 may further identify or retrieve one or more previously calculated modeling scores and/or computational values (e.g., attrition risk, etc.) determined at block 215. In addition, any other input data, for example transaction and/or non-transactional data of the customer, that may be needed for performing the product/service origination optimization may also be identified or retrieved at block 802.

At block 804, the segment associated with the customer may likewise be identified. It will be appreciated that the segment may have been previously determined for the customer at block 210. Following block 804 is block 806. At block 806, the attrition risk associated with the customer may be compared to a threshold value to determine whether the attrition risk is acceptable. For example, the attrition risk may be acceptable if it is less than a threshold value, and unacceptable if it is greater than the threshold, or vice-versa. The threshold value for attrition risk may be set to determine which customers should be considered for one or more products or services in accordance with an example revenue and/or cost improvement optimization. The threshold value may be static in one embodiment. However, in another embodiment, the threshold value may be dynamic, for example, when obtained or set by one or more constraints or preferences at block 310 (or similarly, block 220).

If the attrition risk is not acceptable at block 806, then processing may proceed to block 807, where no action may be recommended for the customer. For example, no action may be recommended for a customer where there is a high likelihood of losing the customer in the next X days. On the other hand, the attrition risk may be acceptable at block 806 and processing may proceed to block 808. At block 808, the customer segment may be utilized at least in part to determine the list of available products or services for possible recommendation. For example, at least a portion of the customers in first segment (e.g., branch churners) may be considered for the following list of available products or services: (i) debit card, (ii) debit rewards for signature-based card transactions, (iii) an ATM deposit incentive (e.g., an entry in a promotional giveaway), (iv) an online banking incentive (e.g., $X bonus for your first online banking bill payment), or (v) fee adjustment (increase or decrease for one or more products or services). Likewise, at least a portion of the customers in the second segment (e.g., young digerati) may be considered for the following list of available products or services: (i) home equity line of credit with an access provision for online banking transfers to a checking or money market account, (ii) a "package" of rewards services tied to a checking account that can be redeemed for online purchases, or (iii) "no holds" on deposits made to ATM.

Following block 808 is block 810. At block 810, the list of available products or services generated at block 808 may be updated to remove those products or services already utilized by the customer. The removal of duplicative products or services from the list prevents the customer from being offered a product or service that the customer already owns or utilizes, according to an example embodiment of the invention. Following block 810, processing may proceed to block 812. At block 812, if the updated list is empty, then processing may proceed to block 807, where no action may be recommended for the customer. On the other hand, at block 812, if the updated list is not empty, then processing may proceed to block 814.

Block 814 may set the Nth product/service to be a next (e.g., not-yet-processed) product/service in the updated list. Processing may proceed from block 814 to block 816, where it is determined whether the end of the updated list has been reached. If the end of the list has not been reached at block 816, then processing may proceed to block 820. Block 820 may determine whether the eligibility requirement(s)/criteria for the Nth product/service have been satisfied. If block 820 has been satisfied, then the Nth product/service eligibility is set to "yes" at block 824; in other words, the customer is eligible for the Nth product/service, according to an example embodiment of the invention. On the other hand, if block 820 has not been satisfied, then the Nth product/service eligibility is set to "no" at block 822; in other words, the customer is not eligible for the Nth product/service. It will be appreciated that there may be a variety of requirements/criteria utilized for block 820. As an example, Table VI below illustrates a few eligibility requirements/criteria for example products/services.

TABLE VI

| Product/Service | Eligibility Requirement(s)/Criteria |
| --- | --- |
| Debit Card Offering | Customer currently does not have debit card |
| Debit card activation | Customer has a debit card but has not activated it |
| Debit card Rewards | Customer has a debit card, has activated, but has not used card in past X days or months |
| Debit Card Purchase Incentives | Customer makes purchases on debit card, but only for certain categories (gas only/gas and groceries/Get cash from ATMs only) |
| Debit Rewards for Signature-based Card Transactions | Customer has Debit Card and primarily uses PIN-based card transactions (through Electronic Funds Transfers (EFT) network) |
| ATM Deposit Incentive | Customer has made teller-based deposit, but no ATM Deposits within the past X months or does not have an ATM or Debit card |
| Online Banking Incentive | Customer not registered or enrolled for online banking |
| Fee Based Account | Customer has low attrition risk and low current value and/or future value |
| Online Bill Pay | Customer uses online banking but not electronic bill payment |
| Credit Line activation incentive | Customer has a revolving line of credit that has not been activated |

Following block 824 or block 822, processing may return to block 814, where the next product/service in the updated list may be selected. When block 816 determines that the end of the updated list has been reached, processing may proceed to block 818. At block 818, one or more of the eligible products/services may be selected for recommendation. For example, one or more constraints or preferences may have been previously set such that only a maximum number of products/services may be recommended for any particular customer. Accordingly, if the customer is eligible for more than the maximum number of products/services, then a prioritization scheme may be used to determine which products/services are available for recommendation to the customer. For example, the prioritization may be based upon, for example, least costly to most costly cost of acquisition for a product/service, or alternatively or additionally, on most profitable to least profitable product/service. The one or more recommended products/services for the customer may be stored in association with a customer identification in database 170 or data files 172, according to an example embodiment of the invention.

It will be appreciated that the results of performing one or more optimization processes such as those described for blocks 320, 330, 340, may be stored as one or more recommendations for one or more customers, according to an example embodiment of the invention. The recommendations make take the form of offerings of new products/services, modifications to existing products/services, and/or configurations of both new and existing products/services. The recommendations may be stored in database 170 and/or data files 172, perhaps in conjunction with a customer identifier to facilitate later retrieval of any recommendations for particular customers. The recommendations may be provided for utilization in many different ways and formats. For example, the optimization computer 160 may operate as an application service provider (ASP) such that the one or more recommendations for one or more customers can be available for retrieval by a financial institution computer 140. Indeed, a financial institution computer 140 may be operated by a teller at a financial institution, a customer service representative at a call center associated with the financial institution, an automated teller machine (ATM), or any other employee, contractor, or entity associated with the financial institution. The optimization computer 160 can also push or deliver the one or more recommendations for one or more customers to a financial institution computer 140 (or other computer), which can then store the recommendations with its own financial institution data and use it in the context of a variety of financial institution applications (e.g., data mining, campaign management, teller interfaces, customer care interfaces, online banking interacting directly with the bank customer, etc.). On the other hand, an optimization computer 160 can also run the optimization processes described herein such that the recommendations generated from the optimizations can be available locally at the optimization computer 160. However, the optimization computer 160 may also function as an application service provider for any number of internal or external business units, subsidiaries, or affiliates, including other financial institutions, according to an example embodiment of the invention.

In some example embodiments, the recommendations may already specify a channel for contacting the customer in conjunction with the recommendation. However, in other example embodiments, the channel may need to be determined for a particular customer. It will be appreciated that many channels may be available, which may be electronic or non-electronic channels. Example channels can include paper mailings, facsimile, email, text message, instant message, Internet presentation (e.g., via online banking website, mobile application, etc.), or an interactive voice response system (IVR). Other channels can include in-person communications with a teller or other representative of a financial institution, a phone call with a customer service representative, video conference, and the like. The channel can be determined in one of many ways, including, but not limited to one or more of the following:

- Based upon the prior channels utilized by the customer: A channel can be selected by identifying one of (i) the channel utilized most often (e.g., a majority) by the customer over a period of time; or (ii) the most recent channel utilized by the customer.
- Based upon a segment of the customer: The customer segment may be indicative of whether customers in a particular segment are likely to have certain channel preferences. For example, customers in a branch-centric segment, may prefer to communicate directly (e.g., in-person) with a teller or employee at a financial institution, or otherwise receive paper mailings. On the other hand, customers in a more technologically savvy segment, may prefer to receive electronic communications, such as communications through email, text message, webpage presentation, mobile application, automated teller machine, etc.
- Multi-channel: Where a customer may visit branches, conduct online banking, use telephone banking and use ATMs together. In this case, the multiple channels can be supported.
- Based upon preferences specified by an individual customer: The customer may have previously specified one or more preferred channels for receiving one or more types of communications (e.g., statements, bills, inquiries, new product/service offerings, etc.).

The channel for contacting the customer in conjunction with the recommendation may determine how the recommendation is utilized by financial institution computer 140 and/or optimization computer 160. For example, if the customer will be offered a product/service via paper mailing, then the financial institution computer 140 and/or optimization computer 160 may deliver the recommendation with customer identification information (e.g., name, mailing address) to a printing service to generate and mail the paper mailings to the customers. On the other hand, if the customer will be offered a product/service via email, text message, Internet presentation, facsimile, ATM, or other electronic channels not requiring additional interaction with a person, then the financial institution computer 140 and/or optimization computer 160 may deliver the recommendation with customer identification information to the appropriate electronic systems as necessary to effectuate the delivery. Example customer identification information for the following channels may include, but are not limited to:

- Email: Customer's name, email address
- Text message: Customer's name, mobile telephone number
- Internet presentation: Customer's name, online banking account identification
- Facsimile: Customer's name, fax number
- Automated Teller Machine: Customer's name, bank account number, debit card number, etc.
- Social Network Presentation: Customer's social network addresses or membership number (e.g., for Facebook, Twitter, etc.).

As an example, email, text message, and facsimile communications may be electronically pushed by an appropriate server to the destination indicated by the customer identification (e.g., email address, mobile phone number, fax number, etc.). In this regard, the recommendations can be pushed to the customers with information regarding the recommended product/service. Likewise, one or more of the recommendations can include a hyperlink or other Internet address for enrollment or registration in the product/service, or otherwise indicating where additional information can be obtained for the recommended product or service, according to an example embodiment of the invention. For recommendations by Internet presentation or Automated Teller Machine (ATM), the recommendations may be stored for ready access such that recommendations are presented when the customer accesses online banking functionality through an Internet website, a mobile financial application, or otherwise accesses functionality of an ATM.

The operations described and shown with reference to the above methods may be carried out or performed in any suitable order as desired in various embodiments of the invention. Additionally, in certain embodiments, at least a portion of the operations may be carried out in parallel. Furthermore, in certain embodiments, less than or more than the operations described herein may be performed.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. A special-purpose computer may be a general-purpose computer that is programmed to perform one or more of the steps discussed herein. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
    at least one network interface configured to receive customer data associated with a customer of a financial institution, the customer data comprising at least one of (i) financial transaction data associated with the customer, or (ii) financial account data associated with the customer;
    at least one memory storing computer-executable instructions; and
    at least one processor communicatively coupled to the at least one network interface and the at least one memory, wherein the at least one processor is configured to access the at least one memory and execute the computer-executable instructions to:
        determine, based at least in part on at least a portion of the customer data, a customer segment to associate with the customer;
        determine an attrition risk associated with the customer;
        determine a respective probability of purchase associated with the customer for each product or service included in a set of one or more products or services, wherein the set of one or more products or services comprises at least one product or service not currently held by the customer;
        determine (i) a respective projected balance amount, (ii) a respective measure of profitability, and (iii) a respective projected cost associated with each of at least one product or service included in the set of one or more products or services, wherein at least one of the (i) respective projected balance amount, (ii) the respective measure of profitability, or (iii) the respective projected cost associated with a product or service included in the set of one or more products or services is determined based at least in part on information associated with the customer segment;
        determine a respective product or service future value associated with each of the at least one product or service included in the set of one or more products or services based at least in part on a respective value of $P*PB*MP*(1-AR)-PC$, wherein P represents the respective probability of purchase, PB represents the respective projected balance amount, MP represents the respective measure of profitability, AR represents the attrition risk associated with the customer, and PC represents the respective projected cost;
        determine a customer future value associated with the customer, wherein the customer future value comprises a combination of each respective product or service future value;
        determine, based at least in part on the customer future value and one or more selection criteria, a recommended next action; and
        direct the at least one network interface to transmit information relating to the recommended next action.

2. The system of claim 1, wherein the at least one processor is further configured to execute the computer-executable instructions to:
    determine that the respective probability of purchase associated with a product or service not currently held by the customer of the at least one product or service not currently held by the customer meets or exceeds a threshold value, and
    wherein the at least one processor is configured to execute the computer-executable instructions to determine the recommended next action responsive, at least in part, to the determination that the respective probability of purchase associated with the product or service not currently held by the customer of the at least one product or service not currently held by the customer meets or exceeds a threshold value.

3. The system of claim 1, wherein the at least one processor is further configured to execute the computer-executable instructions to determine that the customer future value meets or exceeds a threshold value, and wherein the at least one processor is configured to execute the computer-executable instructions to determine the recommended next action responsive, at least in part, to the determination that the customer future value meets or exceeds the threshold value.

4. The system of claim 1, wherein the at least one processor is further configured to execute the computer-executable instructions to determine that the customer future value meets or exceeds a threshold value, and wherein, to determine the recommended next action, the at least one processor is further configured to execute the computer-executable instructions to:
    identify, responsive to the determination that the customer future value meets or exceeds the threshold value, a subset of one or more products or services from the set of one or more products or services, wherein the respective product or service future value associated with each product or service included in the subset is greater than the respective product or service future value associated with each product or service included in the set of one or more products or services and not included in the subset.

5. The system of claim 4, wherein the subset comprises a plurality of products or services, and wherein, to determine the recommended next action, the at least one processor is further configured to execute the computer-executable instructions to:
    identify a first product or service included in the subset, wherein the respective product or service future value associated with the first product or service is greater than each respective product or service future value associated with each other product or service included in the subset, and
    wherein the recommended next action corresponds to an offering of the first product or service to the customer.

6. The system of claim 1, wherein the at least one processor is further configured to execute the computer-executable instructions to:

determine a respective product or service current value for each of at least one product or service currently held by the customer among the set of one or more products or services; and
determine a customer current value associated with the customer based at least in part on each respective product or service current value for each of the at least one product or service currently held by the customer.

7. The system of claim 6, wherein the at least one processor is further configured to execute the computer-executable instructions to:
determine an overall value associated with the customer based at least in part on a combination of the customer current value and the customer future value; and
determine a value level associated with the customer based at least in part on at least one of: (i) a comparison of the overall value associated with the customer to one or more overall value thresholds or (ii) a comparison of the customer future value to a first threshold and a comparison of the customer current value to a second threshold,
wherein the recommended next action is determined based at least in part on the value level associated with the customer.

8. The system of claim 7, wherein the at least one processor is further configured to execute the computer-executable instructions to:
identify, based at least in part on the value level associated with the customer, the one or more selection criteria, wherein the one or more selection criteria comprise a respective set of one or more eligibility rules associated with each of a plurality of candidate recommended next actions;
analyze the respective set of one or more eligibility rules associated with each of at least one of the plurality of candidate recommended next actions;
determine, based at least in part on the analyzing, that each eligibility rule in the respective set of one or more eligibility rules associated with a particular candidate recommended next action is satisfied; and
select the particular candidate recommended next action as the recommended next action.

9. The system of claim 8, wherein the respective set of one or more eligibility rules associated with each of the plurality of candidate recommended next actions is identified based at least in part on at least one of: (i) the customer segment associated with the customer, (ii) the customer current value, (iii) the customer future value, or (iv) one or more optimization objectives associated with the financial institution.

10. The system of claim 8, wherein, to determine the recommended next action, the at least one processor is configured to execute the computer-executable instructions to:
determine, based at least in part on the value level associated with the customer, that the customer is eligible for a plurality of candidate recommended next actions;
prioritize the plurality of candidate recommended next actions based at least in part on at least one of: (i) an optimization objective specified by the financial institution or (ii) a constraint specified by the financial institution; and
select a candidate recommended next action of the plurality of candidate recommended next actions as the recommended next action based at least in part on the prioritizing.

11. The system of claim 1, wherein, to determine the recommended next action, the at least one processor is configured to execute the computer-executable instructions to:
determine, based at least in part on the customer future value, that the customer is eligible for a plurality of candidate recommended next actions;
prioritize the plurality of candidate recommended next actions based at least in part on at least one of: (i) an optimization objective specified by the financial institution or (ii) a constraint specified by the financial institution; and
select a candidate recommended next action of the plurality of candidate recommended next actions as the recommended next action based at least in part on the prioritizing.

12. The system of claim 1, wherein the at least one processor is further configured to execute the computer-executable instructions to:
identify the set of one or more products or services based at least in part on at least one of: (i) an optimization objective specified by the financial institution or (ii) a constraint specified by the financial institution.

13. The system of claim 1, wherein the recommended next action comprises one of:
(i) an offering of one or more of the at least one product or service not currently held by the customer, or
(ii) one or more modifications to at least one product or service currently held by the customer and included in the set of one or more products or services.

14. The system of claim 1, wherein the at least one processor is further configured to execute the computer-executable instructions to:
determine one or more communication channels for presenting the customer with the information relating to the recommended next action, wherein the one or more communication channels are (i) determined based at least in part on one or more preferences specified by the customer, or (ii) determined by analyzing historical data relating to communications between the financial institution and the customer,
wherein the at least one processor is configured to execute the computer-executable instructions to direct the at least one network interface to transmit the information via at least one of the one or more communication channels for presentation to the customer.

15. The system of claim 1, wherein information associated with the customer segment comprises one of: (i) a benchmark value or (ii) historical information associated with a population of one or more customers associated with the customer segment.

16. A method, comprising:
receiving, by a financial system comprising one or more computers, customer data associated with a customer of a financial institution, the customer data comprising at least one of (i) financial transaction data associated with the customer, or (ii) financial account data associated with the customer;
determining, by the financial system and based at least in part on at least a portion of the customer data, a customer segment to associate with the customer;
determining, by the financial system, an attrition risk associated with the customer;
determining, by the financial system, a respective probability of purchase associated with the customer for each product or service included in a set of one or more products or services, wherein the set of one or more products or services comprises at least one product or service not currently held by the customer;
determining, by the financial system, (i) a respective projected balance amount, (ii) a respective measure of profitability, and (iii) a respective projected cost associated with each of the at least one product or service included in the set of one or more products or services, wherein at least one of the (i) respective projected balance amount, (ii) the respective measure of profitability, or (iii) the respective projected cost associated with a product or service included in the set of one or more products or services is determined based at least in part on information associated with the customer segment;

determining, by the financial system, a respective product or service future value associated with each of the at least one product or service included in the set of one or more products or services based at least in part on a respective value of P*PB*MP*(1−AR)−PC, wherein P represents the respective probability of purchase, PB represents the respective projected balance amount, MP represents the respective measure of profitability, AR represents the attrition risk associated with the customer, and PC represents the respective projected cost;

determining, by the financial system, a customer future value associated with the customer, wherein the customer future value comprises a combination of each respective product or service future value;

determining, by the financial system and based at least in part on the customer future value and one or more selection criteria, a recommended next action; and transmitting, by the financial system, information relating to the recommended next action.

17. The method of claim 16, further comprising:
determining, by the financial system, that the respective probability of purchase associated with a product or service not currently held by the customer of the at least one product or service not currently held by the customer meets or exceeds a threshold value, wherein the recommended next action is determined responsive, at least in part, to determining that the respective probability of purchase associated with the product or service not currently held by the customer of the at least one product or service not currently held by the customer meets or exceeds a threshold value.

18. The method of claim 16, wherein the least one product or service comprises a plurality of products or services, further comprising:
determining, by the financial system, that the customer future value meets or exceeds a threshold value, wherein determining the recommended next action comprises identifying, by the financial system and responsive to determining that the customer future value meets or exceeds the threshold value, a first product or service from the plurality of products or services, wherein the respective product or service future value associated with the first product or service is greater than the respective future value associated with each other product or service included in the plurality of products or services, and wherein the recommended next action corresponds to an offering of the first product or service to the customer.

19. The method of claim 16, further comprising:
determining, by the financial system, a respective product or service current value for each of at least one product or service currently held by the customer among the set of one or more products or services; and determining, by the financial system, a customer current value associated with the customer based at least in part on each respective product or service current value for each of the at least one product or service currently held by the customer.

20. The method of claim 19, further comprising:
determining, by the financial system, an overall value associated with the customer based at least in part on a combination of the customer current value and the customer future value; and determining, by the financial system, a value level associated with the customer based at least in part on at least one of: (i) a comparison of the overall value associated with the customer to one or more overall value thresholds or (ii) a comparison of the future value to a first threshold and a comparison of the current value to a second threshold, wherein the recommended next action is determined based at least in part on the value level associated with the customer.

21. The method of claim 20, further comprising:
identifying, by the financial system and based at least in part on the value level associated with the customer, the one or more selection criteria, wherein the one or more selection criteria comprise a respective set of one or more eligibility rules associated with each of a plurality of candidate recommended next actions;

analyzing, by the financial system, the respective set of one or more eligibility rules associated with each of at least one of the plurality of candidate recommended next actions;

determine, by the financial system and based at least in part on the analyzing, that each eligibility rule in the respective set of one or more eligibility rules associated with a particular candidate recommended next action is satisfied; and selecting, by the financial system, the particular candidate recommended next action as the recommended next action.

22. The method of claim 21, wherein the respective set of one or more eligibility rules associated with each of the plurality of candidate recommended next actions is identified based at least in part on at least one of: (i) the customer segment associated with the customer, (ii) the customer current value, (iii) the customer future value, or (iv) one or more optimization objectives associated with the financial institution.

23. The method of claim 16, wherein determining the recommended next action comprises:
determining, by the financial system and based at least in part on the customer future value, that the customer is eligible for a plurality of candidate recommended next actions;

prioritizing, by the financial system, the plurality of candidate recommended next actions based at least in part on at least one of: (i) an optimization objective specified by the financial institution or (ii) a constraint specified by the financial institution; and selecting, by the financial system, a candidate recommended next action of the plurality of candidate recommended next actions as the recommended next action based at least in part on the prioritizing.

24. A system, comprising:
at least one network interface configured to receive customer data associated with a customer of a financial institution, the customer data comprising at least one of (i) financial transaction data associated with the customer, or (ii) financial account data associated with the customer;

at least one memory storing computer-executable instructions; and at least one processor communicatively coupled to the at least one network interface and the at least one memory, wherein the at least one processor is configured to access the at least one memory and execute the computer-executable instructions to:

determine, based at least in part on at least a portion of the customer data, a customer segment to associate with the customer;

identify a candidate product or service under consideration for offering to the customer;

determine, based at least in part on at least a portion of the customer data, that the customer does not currently hold the candidate product or service;

determine an attrition risk associated with the customer;

determine that a probability of purchase associated with the customer for the candidate product or service meets or exceeds a first threshold value;

determine, responsive to a determination that the probability of purchase associated with the customer for the candidate product or service meets or exceeds the first threshold value, a future value associated with the candidate product or service based at least in part on a value of $P*PB*MP*(1-AR)-PC$, wherein P represents the probability of purchase, AR represents the attrition risk associated with the customer, and PB, MP, and PC represent a projected balance amount, a measure of profitability, and a projected cost associated with the candidate product or service, respectively, and wherein at least one of PB, MP, or PC are determined based at least in part on information associated with the customer segment;

determine that the future value meets or exceeds a second threshold value;

determine, responsive to the determination that the future value meets or exceeds the second threshold value, that the customer is eligible for an offering associated with the candidate product or service; and store, in one or more datastores, information indicative of the determination that the customer is eligible for the offering in association with an identifier associated with the customer.

25. The system of claim 24, wherein the at least one processor is configured to determine at least one of the first threshold value or the second threshold value based at least in part on a respective set of one or more preferences or constraints.

26. The system of claim 24, wherein the at least one processor is further configured to execute the computer-executable instructions to direct the at least one network interface to transmit information relating to the offering for presentation to the customer via one or more communication channels.

* * * * *